United States Patent
Karlsson et al.

(10) Patent No.: US 8,816,663 B2
(45) Date of Patent: Aug. 26, 2014

(54) FEEDFORWARD DIGITAL CONTROL UNIT FOR SWITCHED MODE POWER SUPPLY AND METHOD THEREOF

(75) Inventors: Magnus Karlsson, Oskarshamn (SE); Fredrik Wahledow, Färjestaden (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 141 days.

(21) Appl. No.: 13/318,609

(22) PCT Filed: Feb. 26, 2010

(86) PCT No.: PCT/EP2010/052468
§ 371 (c)(1), (2), (4) Date: Nov. 2, 2011

(87) PCT Pub. No.: WO2011/103928
PCT Pub. Date: Sep. 1, 2011

(65) Prior Publication Data
US 2012/0049908 A1 Mar. 1, 2012

(51) Int. Cl.
*H02M 3/157* (2006.01)
*H02M 1/00* (2006.01)

(52) U.S. Cl.
CPC ...... *H02M 3/157* (2013.01); *H02M 2001/0022* (2013.01)
USPC .......................................................... 323/283

(58) Field of Classification Search
USPC ......... 323/282, 283, 284, 285, 241, 280, 322, 323/325, 349, 351
See application file for complete search history.

(56) References Cited

U.S. PATENT DOCUMENTS

| | | | | |
|---|---|---|---|---|
| 4,692,737 A | * | 9/1987 | Stikvoort | 340/347 |
| 4,891,744 A | * | 1/1990 | Yamamoto | 363/89 |
| 5,602,591 A | * | 2/1997 | Saiki | 348/452 |
| 8,085,024 B2 | * | 12/2011 | Prodic et al. | 323/283 |
| 8,285,502 B2 | * | 10/2012 | Kenly et al. | 702/64 |

* cited by examiner

*Primary Examiner* — Gary L Laxton
*Assistant Examiner* — Trinh Dang

(57) ABSTRACT

To calculate a control signal for the duty cycle of a switched mode power supply (SMPS), a voltage feed forward compensator is integrated into a feedback unit. A control unit has an adder with a first input to receive a signal dependent upon an output voltage. A second input receives a signal from a feedback circuit, and an output outputs a signal comprising the sum of the signals applied to the inputs; another output outputs a control signal for controlling the duty cycle, the control signal is dependent upon the output signal from the adder; a voltage feed forward compensation signal generator calculates a compensation signal to adjust the control signal depending upon an input voltage of the SMPS; and a feedback circuit between the output of the adder and the second input of the adder calculates a compensated feedback signal and to feed the compensated feedback signal to the second input of the adder.

40 Claims, 17 Drawing Sheets

| VFF scheme | Max overshoot [V] | Max undershoot [V] |
|---|---|---|
| Without VFF | 3.952 | -2.373 |
| VFF in cascade (Fig. 1) | 0.228 | -0.131 |
| VFF inside integrator (Fig. 5 and Fig. 7) | 0.480 | -0.192 |
| VFF division less (Fig. 9) | 0.480 | -0.131 |
| VFF multiplier less (Fig. 12) | 0.521 | -0.253 |

Fig. 14

FEEDFORWARD DIGITAL CONTROL UNIT FOR SWITCHED MODE POWER SUPPLY AND METHOD THEREOF

TECHNICAL FIELD

The present invention generally relates to the field of switched mode power supplies (sometimes referred to as switch mode power supplies or switching mode power supplies) and more specifically to determination of a control signal for controlling the duty cycle of a switched mode power supply.

BACKGROUND

The switched mode power supply (SMPS) is a well-known type of power converter having a diverse range of applications by virtue of its small size and weight and high efficiency. For example, SMPSs are widely used in personal computers and portable electronic devices such as cell phones. An SMPS achieves these advantages by switching a switching element such as a power MOSFET at a high frequency (usually tens to hundreds of kHz), with the frequency or duty cycle of the switching being adjusted using a feedback signal to convert an input voltage to a desired output voltage.

An SMPS may take the form of a rectifier (AC/DC converter), a DC/DC converter, a frequency changer (AC/AC) or an inverter (DC/AC).

In most SMPS topologies, the output voltage, $V_{out}$, is directly proportional to the input voltage, $V_{in}$:

$$V_{out} \propto DV_{in} \qquad \text{Equation 1}$$

In Equation 1 above, D is the duty cycle of the switching.

To minimise the difference between the actual output voltage and the desired output voltage, the duty cycle is usually controlled in dependence upon a feedback signal, wherein the feedback signal is an error signal between a measured output voltage and a desired output voltage. The error signal is fed back to a feedback unit that controls the duty cycle so that the measured output voltage is adjusted to the desired output voltage.

It is preferable for the output voltage of the SMPS to remain at its desired level under all conditions. However, transients on the input voltage will cause the output voltage to change almost immediately.

Typically, only the inertia in an output filter of the SMPS will decrease this effect. In addition the error signal fed back to the feedback unit is often too slow in changing the duty cycle, which introduces a large transient on the output voltage.

A known solution to the problems caused by input transients is to cascade a voltage feedforward (VFF) compensator 102 with a feedback unit 101 as shown in FIG. 1.

In the cascade, or series, arrangement shown in FIG. 1, the feedback unit 101 calculates a duty cycle for an SMPS (not shown in FIG. 1). The VFF compensator 102, which is separate from the feedback unit, calculates and applies VFF compensation to adjust the duty cycle that has already been calculated by the feedback unit 101.

Known feedforward systems based on the arrangement of FIG. 1 are disclosed in:

Calderone, L. Pinola, V. Varoli, □Optimal feed-forward compensation for PWM DC/DC converters with □linear□ and □quadratic□ conversion ratio, *IEEE trans, Power Electron.*, vol. 7, No. 2, pp 349-355, April 1992.

B. Arbetter and D. Marksimovic, □Feedforward Pulse Width Modulators for Switching Power Converters,□ *IEEE trans, Power Electron.*, vol. 12, no. 2, pp 361-368, March 1997.

M. K. Kazimierczuk, A. J. Edstron, □Open-loop peak voltage feedforward control of PWM Buck converter□ *IEEE trans. Circuits and Systems I*, vol. 47, No. 5, pp. 740-746, May 2000.

J.-P. Sjoroos, T. Suntio, J. Kyyra, K. Kostov, □Dynamic performance of buck converter with input voltage feedforward control,□ *European Conference on Power Electronics and Applications*, 2005.

An SMPS controlled by a digital control unit is shown in FIG. 2.

The input and output voltages of the SMPS 201 are sampled and converted to digital samples by analogue-to-digital converters (ADCs) 202 and 203.

Logic units 204 and 205 are used for transforming the samples to a form suitable for processing by the digital control unit and for noise filtering.

The output voltage samples from logic unit 205 are fed to the feedback unit 206, which applies a control law as explained below.

A typical control law for controlling the duty cycle of an SMPS is a proportional-integral-difference (PID), also referred to as proportional-integral-differential or proportional-integral-derivative, control law. Implementations of a feedback unit that apply a PID control law are shown in FIGS. 3A and 3B.

In both FIGS. 3A and 3B, X(n) is an error signal, representing the difference between a desired and an actual signal, wherein the signals are typically sampled values of a measured voltage. Y(n) is a correction signal calculated in dependence upon the error signal.

As can be seen from in FIG. 3A, X(n) is split into three signals.

The first signal is split and one part of the split signal is delayed by delay element 301. The delayed part of the signal is subtracted from the non-delayed part to generate a difference signal that is input to amplifier 305.

The second signal is a proportional signal and is input to amplifier 306.

The third signal is input to adder 302. The output from adder 302 is split and one part of the split signal is delayed by delay element 304. The delayed part of the signal is input to adder 302. The non-delayed part is an integral signal and is input to amplifier 307.

Proportional, integral and difference signals are therefore generated.

Generally speaking, the proportional signal determines the reaction to the current error signal, the integral signal determines the reaction based on the sum of recent error signal values (i.e. recent samples of the error signal) and the difference signal determines the reaction based on the rate at which the error signal is changing.

The proportional, integral and difference signals fed into amplifiers, or multipliers, 305, 306 and 307, are weighted by their respective gains of $K_D$, $K_P$ and $K_I$. The outputs of amplifiers 305, 306 and 307 are input to adder 308. The output of adder 308, which comprises a summation of the input signals to adder 308, is the control signal generated according to the PID control law.

The gains $K_P$, $K_I$ and $K_D$ determine the response of the feedback unit and are set according to system requirements (such as response time to an error or extent of overshoot, for example).

A PID circuit with simplified hardware is shown in FIG. 3B.

In the PID implementation in FIG. 3B, the input signal X(n) is split and one part of it is input to amplifier, or multiplier, 311. The other part of is input to delay element 309.

The output of delay element 309 is split and one part of it is input to amplifier, or multiplier, 312. The other part of the output of delay element 309 is input to delay element 310. The output of delay element 310 is input to amplifier, or multiplier, 313.

The outputs of amplifiers, or multipliers, 311, 312 and 313 are input to the adder 314. The output of the adder 314 is split and one part of the split signal is output as the control signal. The other part of the slit signal is fed to delay element 315. The output of delay element 315 is input to the adder 314.

For the circuit design in FIG. 3B to correspond to that in FIG. 3A, the gains KA, KB and KC are calculated as:

$$KA = K_I + K_P + K_D \quad \text{Equation 2}$$

$$KB = (K_P + 2K_D) \quad \text{Equation 3}$$

$$KC = K_D \quad \text{Equation 4}$$

In the circuit of FIG. 3B, there is a feedback loop between the output of the adder 314 and an input to the adder. The feedback signal input to the adder typically is referred to as the integral signal and it is input to the integral input of the adder. A feedback unit with such an input to the adder is said to comprise an integrator.

The above PID control law is described, for example, in M. A. Alexander, D. E. Heineman, K. W. Fernald, S. K. Herrington, ☐Hardware efficient digital control loop architecture for a power converter,☐ U.S. Pat. No. 7,239,257 B1 (Jul. 3, 2007).

In the feedback unit of FIG. 3B, the inputs to the adder 314 are weighted by constant factors (i.e. KA, KB and KC are constant; and the output of delay element 315 is weighted by the constant one). The circuit implementation is therefore an example of a direct form 1 implementation of a digital filter of order 2. Direct form 2 and transposed direct designs of feedback unit are also possible.

It will therefore be appreciated that the above-described PID control law is just one example of a suitable control law for determining the duty cycle of a SMPS. Many alternative control laws are also possible, such as PI, PD, P, I and FIR for example.

Referring again to FIG. 2, the output from the feedback unit 206 is adjusted by the VFF compensator 207, in dependence upon the input voltage samples from the logic unit 204, to produce a compensated duty cycle control signal.

The VFF compensation reduces the effects of transients on the input voltage so that the output voltage of the SMPS 201 is almost independent of the input voltage.

The compensated duty cycle control signal D is output from the digital control unit and is fed to a digital pulse width modulator 208. The digital pulse width modulator 208 translates the duty cycle control signal from a digital format to a pulse width modulated (PWM) duty cycle signal. The PWM signal is then output to control the switching elements of the SMPS 201.

The conditions for voltage feed forward compensation are explained below.

In a buck converter, the ideal duty cycle, D, is equal to:

$$D = \frac{V_{out}}{V_{in}} \quad \text{Equation 5}$$

When the input voltage changes, from $V_{in\text{-}old}$ to $V_{in\text{-}new}$, the old duty cycle, $D_{old}$, should be scaled to a new duty cycle, $D_{new}$, so the output voltage remains constant.

$$V_{out} = D_{old} V_{in\text{-}old} \quad \text{Equation 6}$$
$$= D_{new} V_{in\text{-}new}$$

Solving Equation 6 for the new duty cycle $D_{new}$ yields, $$D_{new} = \frac{V_{in\text{-}old}}{V_{in\text{-}new}} \cdot D_{old} \quad \text{Equation 7}$$

The computations for the compensation condition described in Equation 7 consist of a division followed by a multiplication. Since the division is a more complex operation than a multiplication, in many cases it is preferable to perform the division by a look-up-table operation followed by an additional multiplication, as shown in Equation 8.

$$D_{new} = \frac{1}{V_{in\text{-}new}} \cdot V_{in\text{-}old} \cdot D_{old} \quad \text{Equation 8}$$

U.S. Pat. No. 7,239,257 B1 discloses the use of a look-up-table for performing such a division.

In addition, U.S. Pat. No. 7,239,257 B1 discloses that when using a feedback unit with an integrator, such as the earlier described feedback unit in FIG. 3B, one of the multiplications can be avoided by using a nominal value of $V_{in\text{-}old} = V_{in\text{-}min}$, where $V_{in\text{-}min}$ is the minimum measured input voltage. The look up table is then scaled with $V_{in\text{-}min}$.

The calculation of a compensated duty cycle therefore becomes:

$$D_{new} = \frac{V_{in\text{-}min}}{V_{in\text{-}new}} \cdot D_{old} \quad \text{Equation 9}$$

Another way of addressing the problem of the computational requirements caused by the divisions is to make the delay in the digital pulse width modulator proportional to the reciprocal of the input voltage. This mixed signal solution is disclosed in X. Zhang and D. Maksimovic, ☐Digital PWM/PFM Controller with Input Voltage Feed-Forward for Synchronous Buck Converters☐, in Proc. IEEE Appl. Power Electron. Conf. Expo., February 2008, pp 523-528.

A problem experienced by known SMPS controllers, that use a feedback unit cascaded with a VFF compensator, is that the calculation of the compensation signal after the calculation of a duty cycle control signal by the feedback unit results in long computation times.

Moreover, the complex and time consuming division operation with an additional multiplication has to be performed every switch period even when the input voltage is stable.

Furthermore, a problem with known digital VFF compensators is that when the input voltage is located near a quantization level of the ADC for the input voltage, measurement noise will sometimes cause the quantized version of the input signal to change. The VFF compensation will then introduce transients on the output voltage even when the input voltage is nearly constant.

Due to the above-identified computational requirements, known systems use a digital signal processor (DSP) to calculate a compensated duty cycle. However, DSPs are expensive, have a high power-consumption and long computation times. DSPs are also large and not suitable for use in compact applications.

Known controllers for an SMPS are therefore inappropriate for applications that require a compact digital control unit in which power-consumption, cost restraints and computation times should be minimized.

SUMMARY OF INVENTION

The present invention provides an apparatus and method for generating a digital control signal for an SMPS, which reduces computation time, power-consumption and cost of generating the digital control signal compared to known approaches.

According to the present invention, a digital control unit is operable to calculate a digital control signal for controlling the duty cycle of a switched mode power supply. The digital control unit comprises an adder with at least a first input arranged to receive a signal dependent upon an output voltage of the switch mode power supply. The adder further comprises a second input arranged to receive a signal from a feedback circuit and an output arranged to output an output signal comprising the sum of the signals applied to the inputs. An output of the digital control unit is arranged to output a digital control signal for controlling the duty cycle of the switched mode power supply, wherein the digital control signal is dependent upon the output signal from the adder. The digital control unit comprises a voltage feed forward compensation signal generator arranged to calculate a compensation signal and operable to adjust the digital control signal in dependence upon an input voltage of the switched mode power supply. The digital control unit further comprises a feedback circuit arranged between the output of the adder and the second input of the adder and arranged to calculate a compensated feedback signal by combining the compensation signal with a signal dependent upon the output of the adder and to feed the compensated feedback signal to the second input of the adder.

This arrangement is advantageous because the digital control unit is provided with a voltage feedforward compensator integrated into a feedback unit. This advantageous circuit implementation allows faster and simpler calculation and application of voltage feedforward compensation on a duty cycle control signal over known digital control units. In addition, a more compact digital control unit is realised.

In a preferred embodiment, the digital control unit has a transient detector. The transient detector is operable to determine if a transient has occurred on the input voltage of the switched mode power supply. A switch is operable to switch the feedback circuit between a first state, in which the signal input to the second input of the adder is dependent upon a combination of the compensation signal calculated in dependence upon the current input voltage of the switched mode power supply and the signal dependent upon the output of the adder, and a second state, in which the signal input to the second input of the adder is dependent upon the output of the adder but not dependent upon a compensation signal calculated in dependence upon the current input voltage. The transient detector is arranged to control the switch in dependence upon the result of the transient determination thereby. Accordingly, the switch switches the feedback circuit into the first state when a transient is detected on the input voltage, and the second state when no transient is detected on the input voltage.

An implementation having the transient detection is advantageous because a voltage feedforward compensation signal is only applied on the output of the digital control unit when a transient is detected. This is inherently more efficient than the operation of the known cascade arrangement of a feedback unit and voltage feedforward detector in which it is necessary to calculate and apply voltage feedforward compensation for every input sample, even when no transient has occurred on the input voltage.

The present invention also provides a method of calculating a digital control signal for controlling the duty cycle of a switched mode power supply. The method comprises measuring an input voltage and an output voltage of the switched mode power supply. The method further comprises adding a first input signal dependent upon an output voltage of the switched mode power supply with a second signal comprising a previously calculated compensated feedback signal to generate a summation signal comprising the sum of the first and second signals. The method further comprises outputting a digital control signal to the switched mode power supply to control the duty cycle thereof such that the digital control signal is dependent upon the summation signal. The method further comprises generating a compensation signal arranged to adjust a subsequent digital control signal in dependence upon the input voltage of the switched mode power supply. The method further comprises calculating a compensated feedback signal by combining the compensation signal with a signal dependent upon the summation signal.

The method of the present invention allows an advantageous calculation and application of voltage feedforward compensation on a duty cycle control signal.

Preferably, the method further comprises determining if a transient has occurred on the input voltage of the switch mode power supply. In this case, the method switches between a first state, in which said previously calculated compensated feedback signal is dependent upon a combination of a compensation signal generated in dependence upon the current input voltage of the switched mode power supply and a signal dependent upon the summation signal, and a second state, in which said previously calculated compensated feedback signal is dependent upon a signal dependent upon the summation signal but not dependent upon a compensation signal generated in dependence upon the current input voltage of the switched mode power supply. The switching between the first and second states is controlled in dependence upon the result of the transient determination such that the digital control signal is calculated in the first state when a transient is detected and the digital control signal is calculated in the second state when a transient is not detected.

Performing transient detection and controlling the generation of the duty cycle control signal in this way is advantageous because a voltage feedforward compensation signal is only applied on the calculated the digital control signal when a transient is detected.

LIST OF FIGURES

FIG. 14 shows experimental results comparing the performance of embodiments of the invention with known digital control units.

DETAILED OF DESCRIPTION OF EMBODIMENTS

As will be explained in detail below, the present inventors have devised a way to reduce processing times for generating a duty cycle control signal for an SMPS by integrating a VFF compensator into a feedback unit.

The integration of the VFF compensator into the feedback unit further allows a more compact implementation of a digital control unit.

In addition, the required processing is reduced by performing an approximation of ideal VFF compensation. The power consumption of the digital control unit is therefore reduced.

First Embodiment

Figure 4:
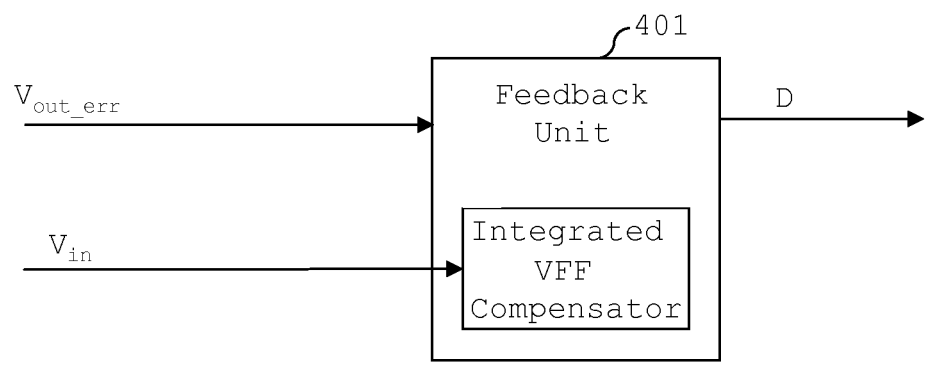
FIG. 4 is a schematic block diagram of a digital control unit according to a first embodiment of the invention.

FIG. 4 is a schematic block diagram of a digital control unit for an SMPS according to a first embodiment of the invention.

In FIG. 4 the digital control unit 401 receives measured input and output voltages that have been digitized by ADCs and processed by logic units as described earlier for known systems.

A feedback unit calculates a duty cycle control signal based upon the measured output voltage. As part of this, a VFF compensator, integrated within the feedback unit, calculates the VFF compensation within the calculations for the duty cycle control signal so that the duty cycle control signal is calculated with appropriate VFF compensation applied.

In the system of FIG. 4, the signal $V_{out}$ that is input to the digital control unit 401 comprises an error signal between the measured output voltage of the SMPS and the desired output voltage. It should be noted however, that as an alternative, the measured output voltage itself could be input to the digital control unit 401, which would then compare the measured output voltage to the desired output voltage of the SMPS and calculate an error signal that is to be used to calculate the duty cycle control signal.

Figure 5:
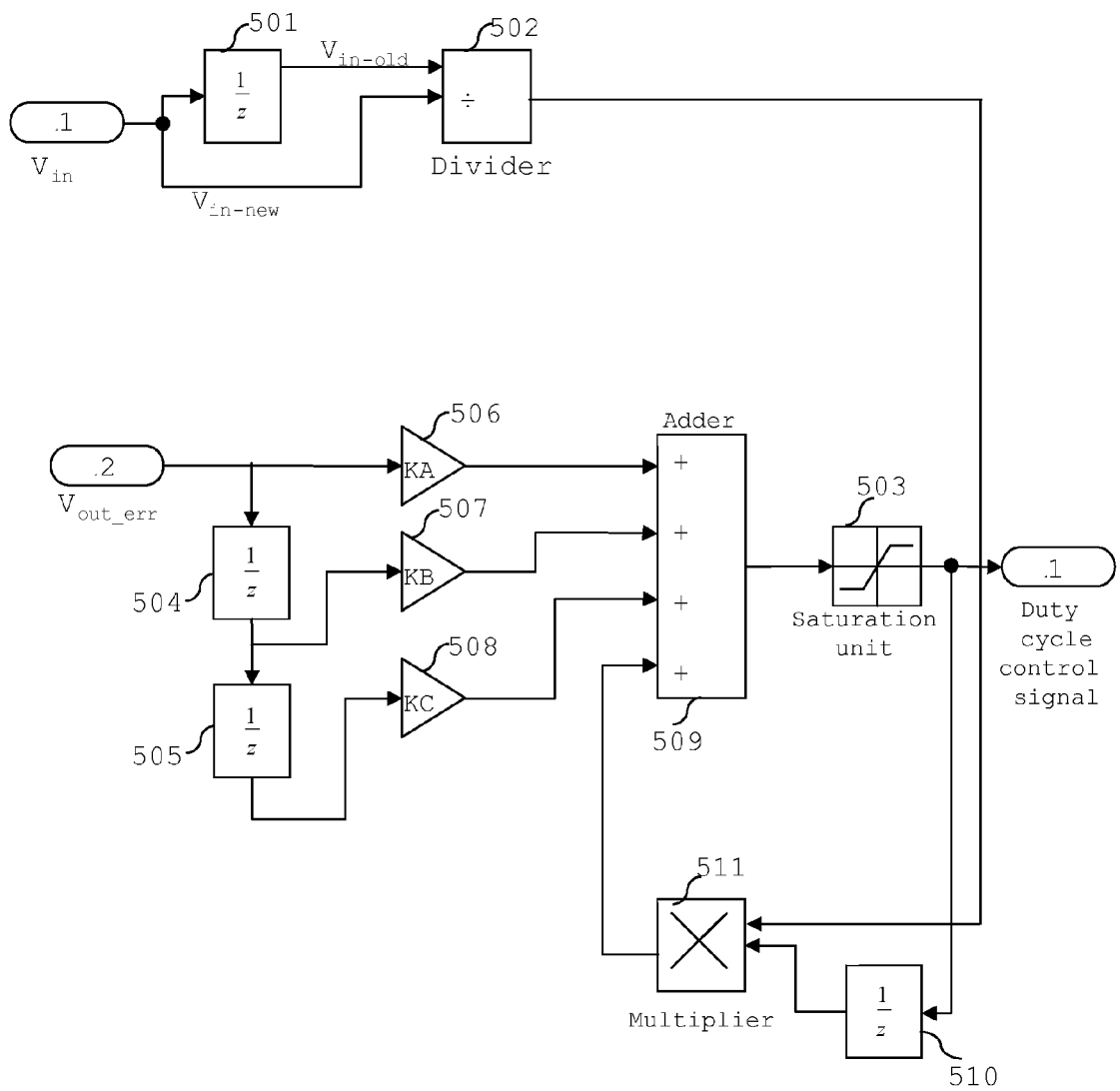
FIG. 5 is a diagram of the digital control unit of the first embodiment.

A diagram of a circuit that includes the required components for implementing the digital control unit of FIG. 4 is shown in FIG. 5 and described below.

Referring to FIG. 5, input port 2 receives the error signal, $V_{out\_err}$, which represents the difference between the measured output voltage and the desired output voltage of the SMPS.

The input signal $V_{out\_err}$ is fed into an arrangement of delay elements 504 and 505 as well as amplifiers, or multipliers, 506, 507 and 508 with respective gains KA, KB and KC. The outputs of the amplifiers are fed into three inputs of an adder 509.

The output of the adder 509 is fed to a hard limiter 503, otherwise referred to as a saturation unit, that limits the output from the digital control unit to within upper and lower limits such that it is within a practical range for the system.

The output from the hard limiter 503 comprises the digital control signal for controlling the duty cycle of the SMPS (not shown in FIG. 5). The output of the hard limiter is fed to a splitter to split the output of the hard limiter into two signals.

Figure 2:
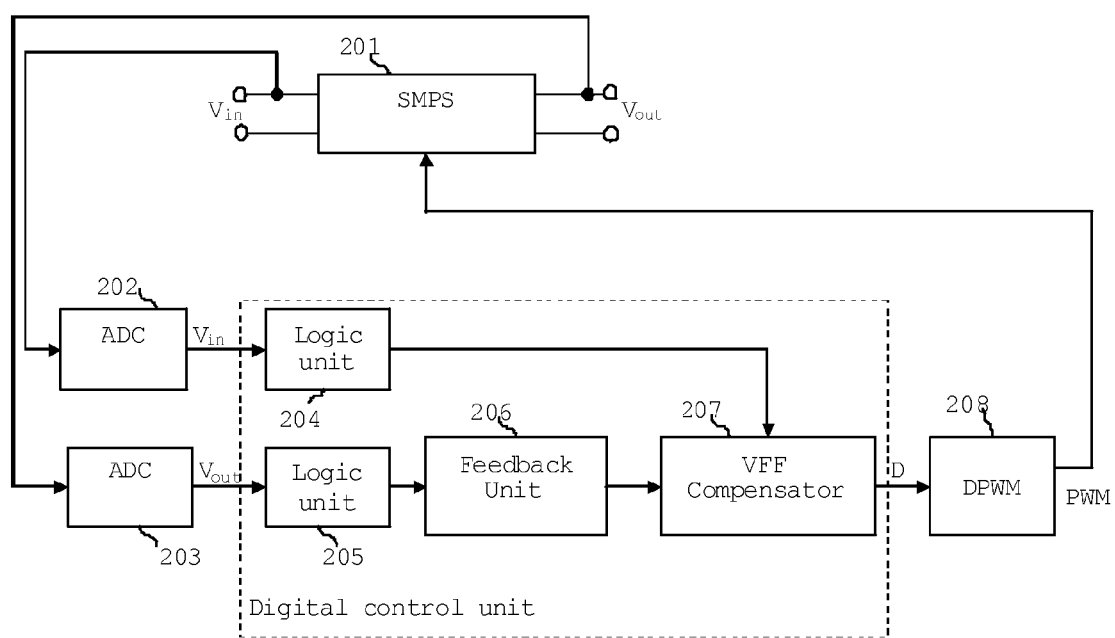
FIG. 2 is a schematic diagram showing a known design of a digital control unit arranged to control a digital pulse width modulator that generates the duty cycle signal of an SMPS.

A first signal from the splitter is output from the digital control unit. This digital control signal output is typically used to control a digital pulse width modulator, such as the digital pulse width modulator 208 shown in FIG. 2, that generates a PWM signal for controlling the duty cycle of the SMPS.

The second signal from the splitter is fed through a delay element 510 and into an input of multiplier 511. The output of a multiplier 511 is input to adder 509.

There is therefore a feedback circuit between the output and an input of the adder 509. The signal input to the adder from the feedback circuit is a feedback signal and may be referred to as an integral signal, at the integral input of the adder.

The feedback of the output of the digital control unit by the feedback circuit has the effect of introducing memory into the system. The output of the digital control unit is therefore dependent upon the current measured output voltage, the current measured input voltage and previous outputs of the digital control unit.

Figure 3A:
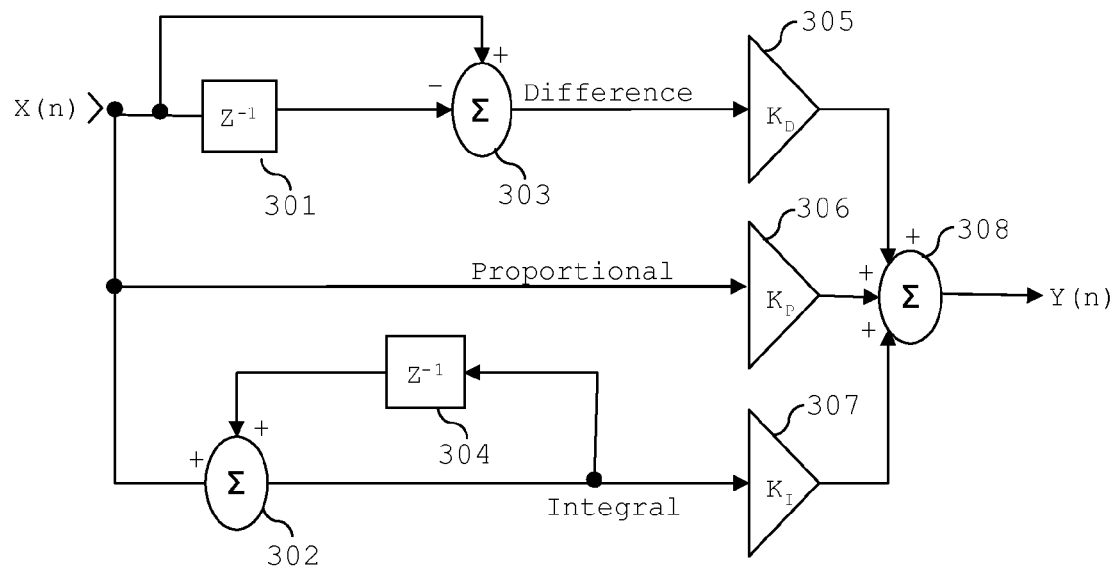
FIG. 3A is a schematic diagram showing a known implementation of a PID controller.
Figure 3B:
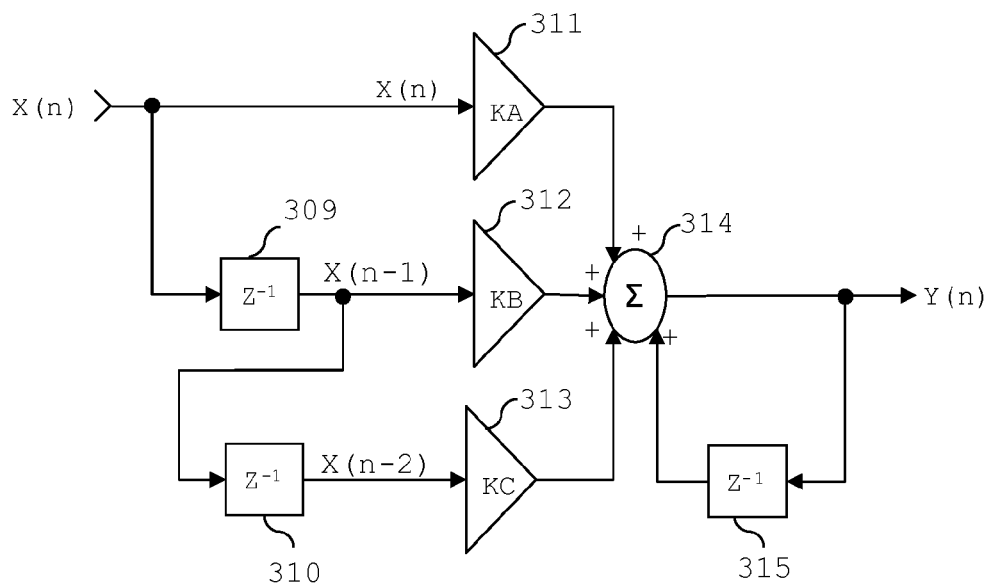
FIG. 3B is a known alternative to the implementation of the PID controller in FIG. 3A that has a simplified circuit design.

In the circuit arrangement described above, delay elements 504, 505 and 510, the amplifiers 506, 507 and 508, and the adder 509 calculate a digital control signal for the SMPS from an error signal, wherein the error signal is calculated from the measured output voltage. This configuration is a known PID implementation of a feedback unit, as described earlier with reference to FIG. 3B, and the gains KA, KB and KC can be determined in accordance with known PID control schemes.

It should be noted that other configurations of feedback unit are possible in an embodiment instead of a PID configuration. For example, a feedback unit that implements PI, PD, P, I, FIR or other control techniques could alternatively have been applied.

Input 1 of the digital control unit in FIG. 5 receives a signal representing the input voltage of the SMPS. The input signal is split and one part is delayed by a delay element 501 and the delayed and non-delayed parts of the input signal are input into a computation unit 502.

In this embodiment computation unit 502 comprises a divider, which divides the delayed part of the input signal by the non-delayed part of the input signal. In some applications, it may be desirable for computation unit 502 to reference a look-up-table to generate the result of the division operation. The output of computation block 502 is a VFF compensation signal that is dependent upon the input voltage of the SMPS.

The VFF compensation signal is input to a combination unit 511. In this embodiment, computation unit 511 comprises a multiplier, which multiplies the VFF compensation signal with the output of delay element 510.

The output of computation unit 511 is a product of the output of delay element 510 (namely, a delayed version of the digital control signal) and the VFF compensation signal output from the computation unit 502.

In this way, VFF compensation is performed on a signal input to adder 509 from the feedback circuit.

By introducing the VFF compensation signal into the feedback circuit of the feedback unit, the digital control unit in FIG. 5 has a VFF compensator integrated into a feedback unit.

The result of applying the VFF compensation signal to a signal within the feedback circuit between an output and an input of adder 509 is that an approximation of the VFF compensation of Equation 7 is provided. Advantageously, however, a compact digital control unit with low computation times is realised.

Figure 6:
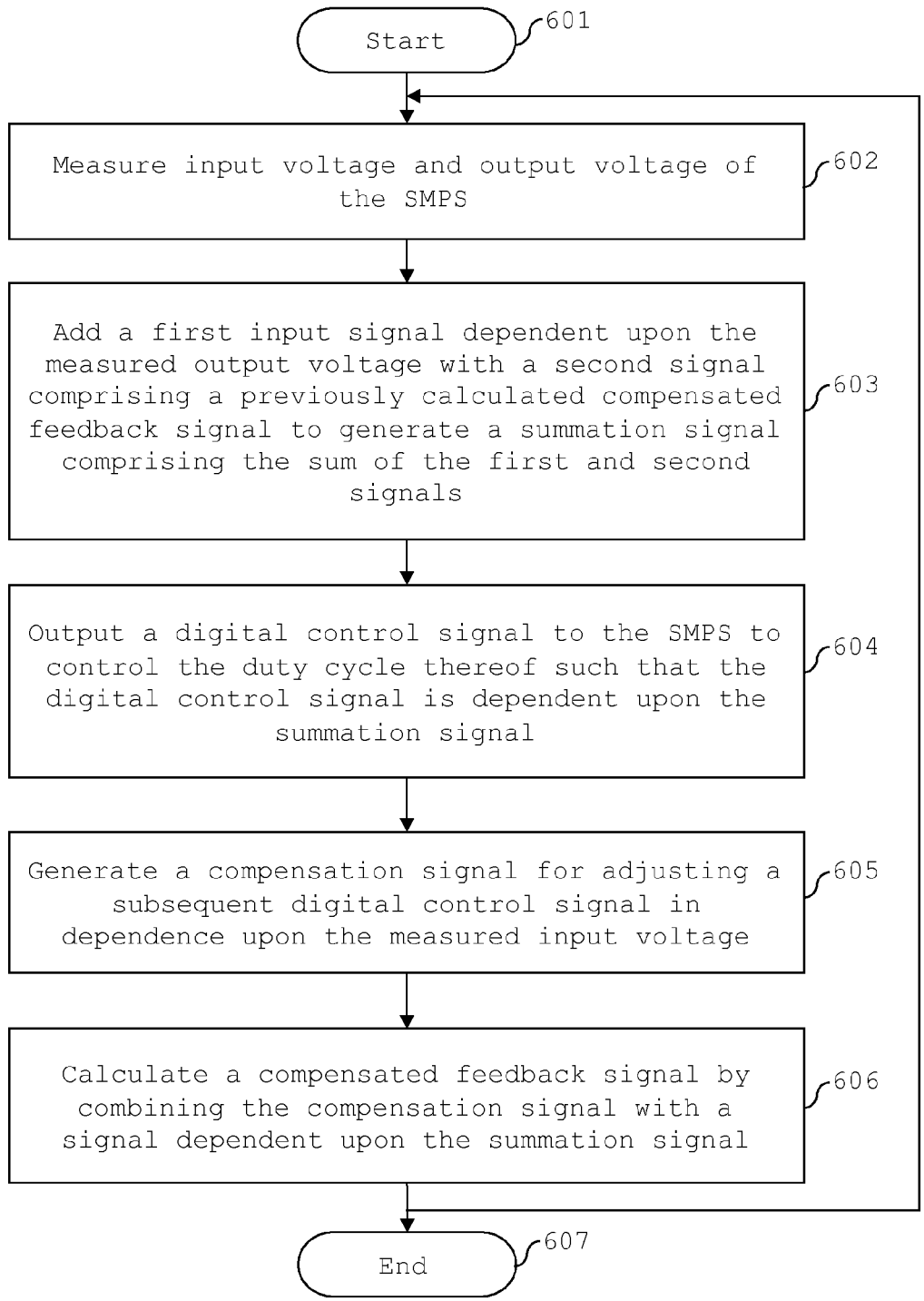
FIG. 6 is a flow chart showing the processes performed by the first embodiment.

FIG. 6 shows a flowchart of the process operations performed by the digital control unit of FIG. 5 for calculating a digital control signal for controlling the duty cycle of a switch mode power supply according to the first embodiment.

Referring to FIG. 6, at step 602 the input voltage and the output voltage of the switched mode power supply are measured and fed to the digital control unit.

The process then proceeds to step 603 at which adder 509 adds a first input signal that is dependent upon an output voltage of the switched mode power supply with a second signal comprising a previously calculated compensated feedback signal to generate a summation signal comprising the sum of the first and second signals.

The process then proceeds to step 604 at which a digital control signal is output to the SMPS to control the duty cycle thereof, wherein the digital control signal is dependent upon the summation signal.

The process then proceeds to step 605 at which a compensation signal for adjusting a subsequent digital control signal is generated in dependence upon the input voltage of the SMPS.

The process then proceeds to step 606 at which a compensated feedback signal is calculated by combining the compensation signal with a signal dependent upon the summation signal.

The process then repeats to continually update the duty cycle control signal in accordance with the VFF computation signal.

Second Embodiment

According to a second embodiment of the invention, the digital control unit further comprises a transient detector.

The transient detector receives consecutive samples of a signal representing the measured input voltage of the SMPS. If two consecutive samples are different, the transient detector determines that there has been a transient on the input signal and a VFF compensation signal is calculated and applied as in the first embodiment.

Alternatively, if the transient detector determines that the consecutive samples are not different, VFF compensation is not applied to a signal in the feedback circuit and the input of adder 509 is a delayed version of the output of the digital control unit.

In the second embodiment, VFF compensation signal is therefore applied only when a transient on the input signal has been detected. This decreases the computation times and requirements of the digital control unit.

Figure 7:
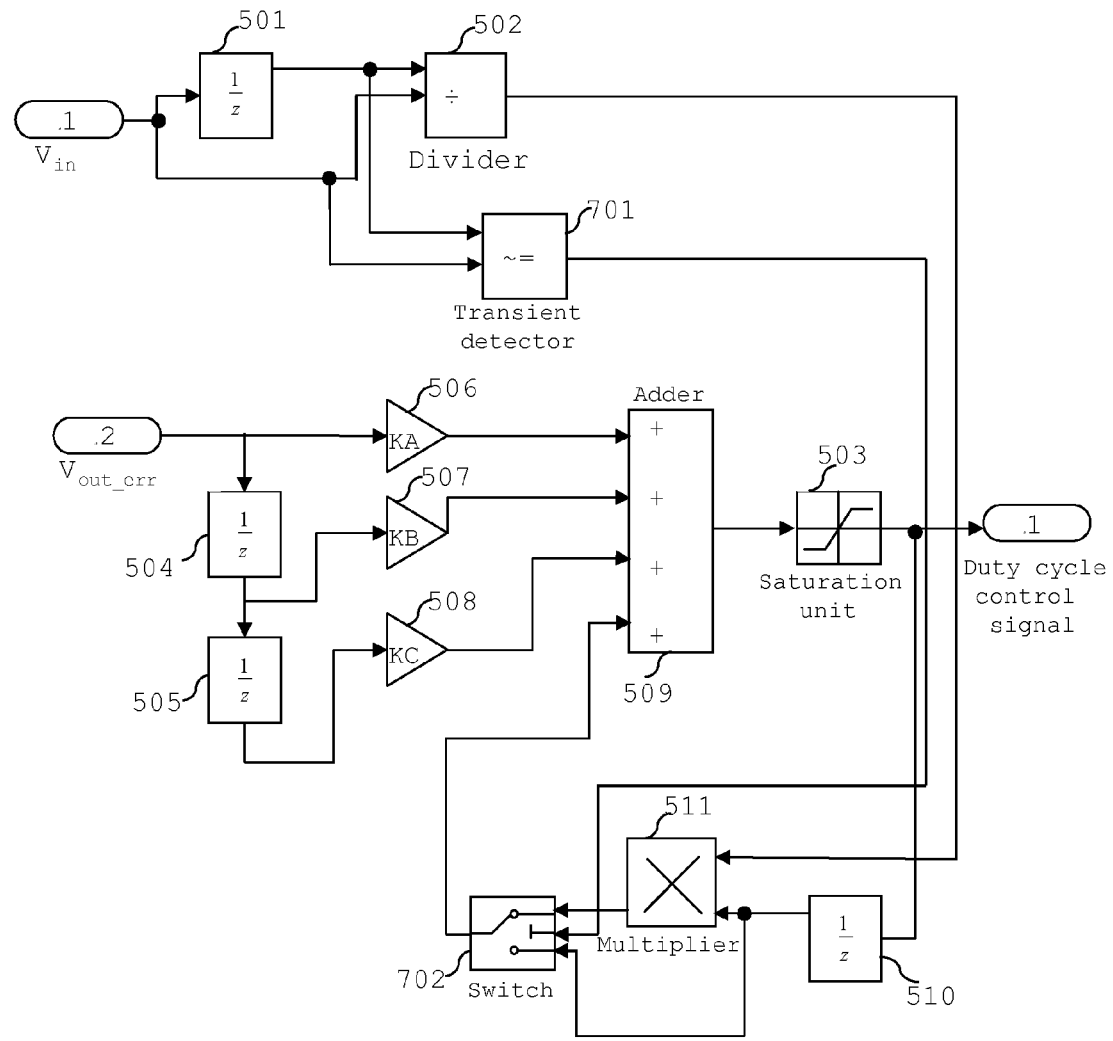
FIG. 7 is a diagram of a digital control unit comprising a transient detector according to a second embodiment of the invention.

FIG. 7 shows a digital control unit according to a second embodiment of the invention.

The components of the second embodiment are the same as those of the first embodiment, with the exception of the transient detector 701 and a switch 702, which will be described below.

In the embodiment of FIG. 7, a comparator is used as the transient detector 701. The comparator 701 receives a signal that represents the current input voltage of the SMPS and a delayed signal that represents a previous input signal (i.e. the comparator receives signals, or samples, of current and previous measured input voltage values), and compares them. If the input signals to the comparator are the same (i.e. the inputs are samples of the same voltage values), the comparator outputs a result indicating that no transient has occurred. However, if the input signals to the comparator are different (i.e. the inputs are samples of the different voltage values), the comparator outputs a result indicating that a transient has occurred.

The result of the determination by transient detector 701 is used to control a switch 702. Switch 702 is arranged in the feedback circuit to receive the signal output form multiplier 511 and the signal output from delay element 510, as well as a control signal from transient detector 701. If transient detector 701 determines that there has been a transient on the input signal, the control signal output from transient detector 701 controls switch 702 to be in the uppermost position shown in FIG. 7 so that the input to adder 509 from the feedback circuit is a signal with VFF compensation applied to it.

Alternatively, if the transient detector 701 determines that there has not been a transient on the input signal, the control signal output from transient detector 701 controls switch 702 to be in the lowermost position shown in FIG. 7 so that the output of delay element 510 is fed to the input of the adder 509 without a VFF compensation signal applied to it. Accordingly, with switch 702 in the lowermost position, the adder 509 receives from the feedback circuit a delayed version of the digital control signal output from the duty cycle control unit.

In the second embodiment, therefore, a VFF compensation signal calculated from the current input signal of the SMPS is applied to the signal input to adder 509 from the feedback circuit only when a transient has been detected on the input voltage of the SMPS.

In the embodiment shown in FIG. 7, the VFF compensation signal is calculated for every sample of the input signal and the VFF compensation signal is combined within the feedback circuit when a transient has been detected. However, in an alternative implementation, the computation unit 502 (and, in a further implementation, multiplier 511) is controlled by the output of the transient detector 701 such that the computation of the VFF compensation signal is performed only when a transient has been detected on the input signal. This further reduces the power-consumption and computational requirements of the digital control unit. In addition, this allows switch 702 to be omitted so that the configuration of the feedback circuit reverts to that of the first embodiment.

Figure 8:
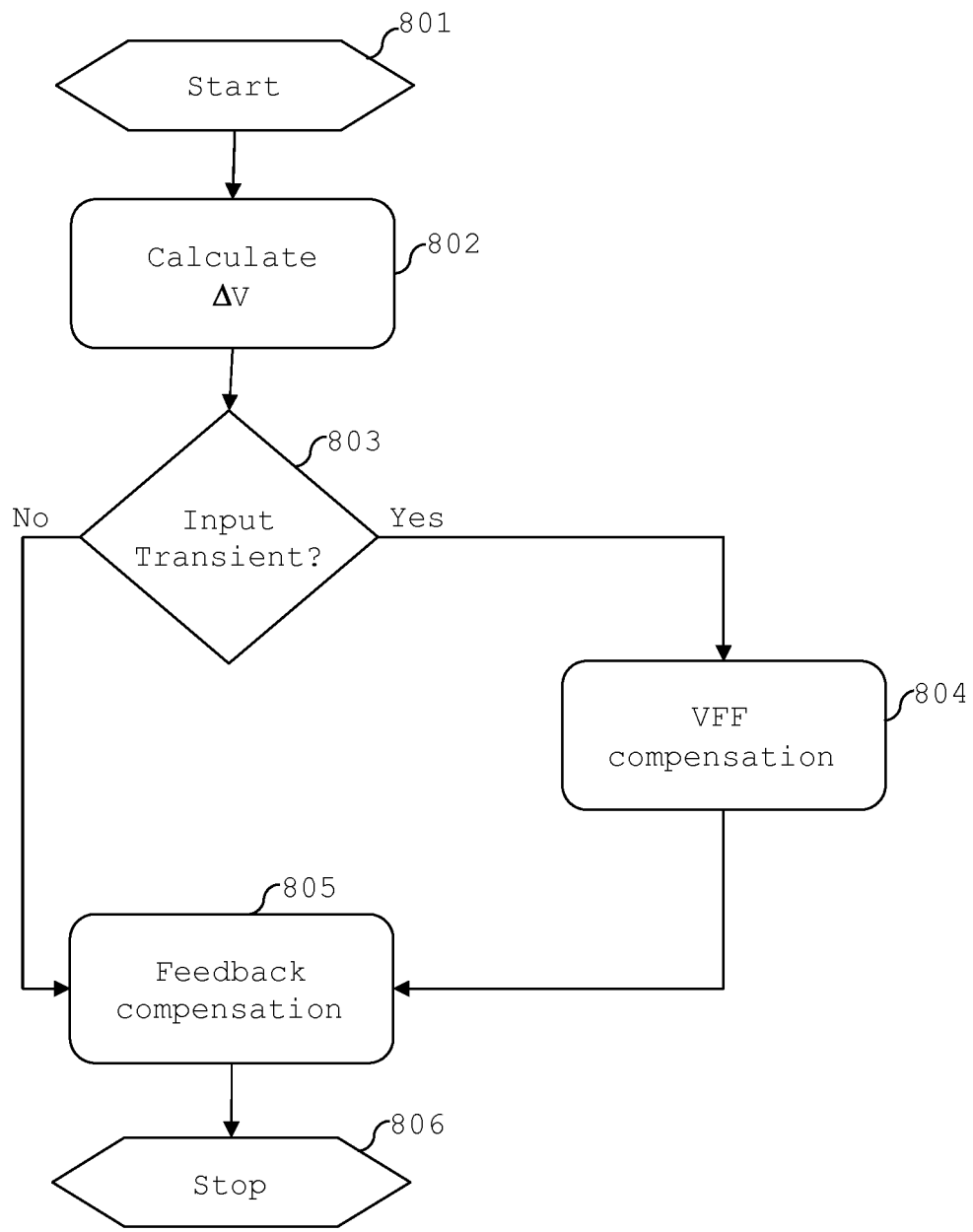
FIG. 8 is a flow chart of processes performed by the second embodiment.

FIG. 8 is a flow chart showing the transient detection operation process according to the second embodiment of the invention.

In step 802, the voltage of the current measured input signal of the SMPS is compared to the voltage of a previous measured input signal of the SMPS to generate a difference signal representing the voltage difference between current and previous measured input signals.

The process then proceeds to step 803, at which the difference signal is used to determine if a transient has occurred. The determination process may, for example, comprise the step of comparing the difference signal to a zero threshold level.

If the result of step 803 is that a transient has occurred, the process proceeds to steps 804 and 805. In steps 804 and 805 a digital control signal is calculated as previously described for the process of the first embodiment and shown in FIG. 6.

On the other hand, if the result of step 803 is that a transient has not occurred, the process proceeds to step 805, omitting step 804, so that feedback compensation is performed using a delayed version of the duty cycle control signal without VFF compensation.

The second embodiment therefore allows the calculation of either a digital control signal with just feedback control or a compensated digital control signal with VFF compensation applied within the feedback control.

Figure 1:
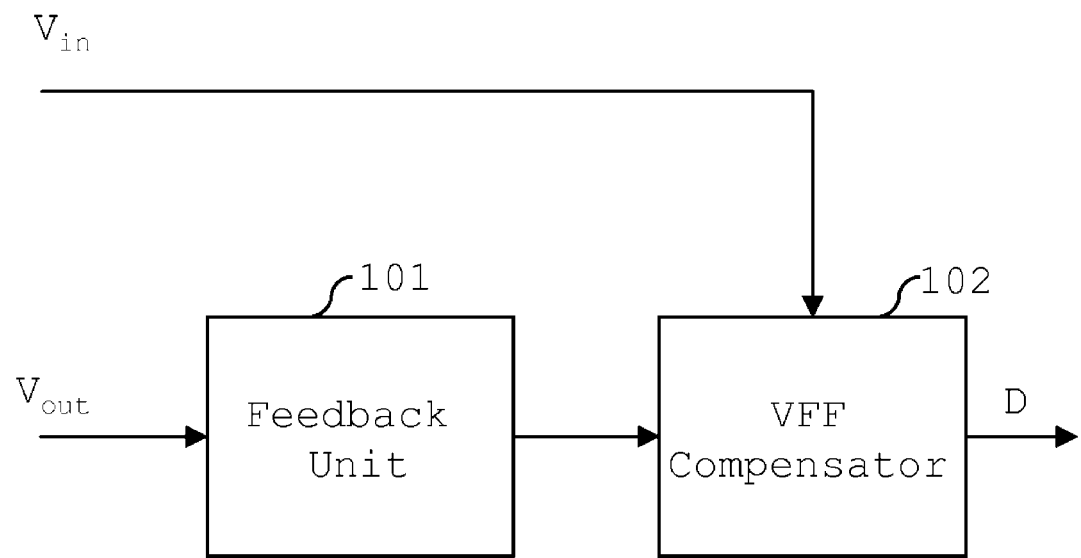
FIG. 1 is a block diagram of a known design of a digital control unit comprising a feedback unit in cascade with a VFF compensator.

This is inherently more efficient than the known system shown in FIG. 1 wherein VFF compensation is calculated and applied for every input sample, even when there has been no transient on the input voltage and there is no need to calculate and apply a VFF compensation signal.

Third Embodiment

The third embodiment of the invention differs from the first and second embodiments in the way in which the VFF compensation signal is calculated and applied.

In the third embodiment, the calculated VFF compensation signal is an approximation of the VFF compensation given in Equation 7.

An advantage of the third embodiment over the previous embodiments of the invention is that the division operation performed by computation block 502 in FIGS. 5 and 7 is avoided and this significantly simplifies the computational requirements of the digital control unit.

Defining the change in input voltage $\Delta V$ as:

$$V_{in-new} = V_{in-old} - \Delta V \qquad \text{Equation 10}$$

An approximate VFF compensation signal can be obtained using the updated duty cycle:

$$D_{new} = D_{old}(1 + \Delta VG) \qquad \text{Equation 11}$$

$$= D_{old} + D_{old}\Delta VG$$

In Equation 11, the new duty cycle, $D_{new}$, is changed with a factor $(1+\Delta VG)$. The change in the input voltage $\Delta V$ is scaled with a factor G. The output voltage becomes:

$$V_{out} = V_{in-new}D_{new} \qquad \text{Equation 12}$$

$$= (V_{in-old} - \Delta V)D_{old}(1 + \Delta VG)$$

$$= D_{old}V_{in-old} - D_{old}\Delta V + D_{old}\Delta VGV_{in-old} -$$

$$D_{old}G(\Delta V)^2$$

Assuming that the gradient in the input voltage is small, the term $D_{old}G(\Delta V)^2$ can be neglected.

The two middle terms of Equation 12 are eliminated and the output voltage becomes almost unchanged if G is chosen as:

$$G = \frac{1}{V_{in-old}} \qquad \text{Equation 13}$$

The division in Equation 13 need not be applied for every sample if it is approximated to a constant gain factor. The inventors have found that choosing a constant G based upon a fixed value of $V_{in-old}$ in the range $V_{in-min} \leq V_{in-old} \leq V_{in-max}$, where $V_{in-min}$ is the minimum measured input voltage and $V_{in-max}$ is the maximum measured input voltage, yields a good approximation in practice.

Figure 9:
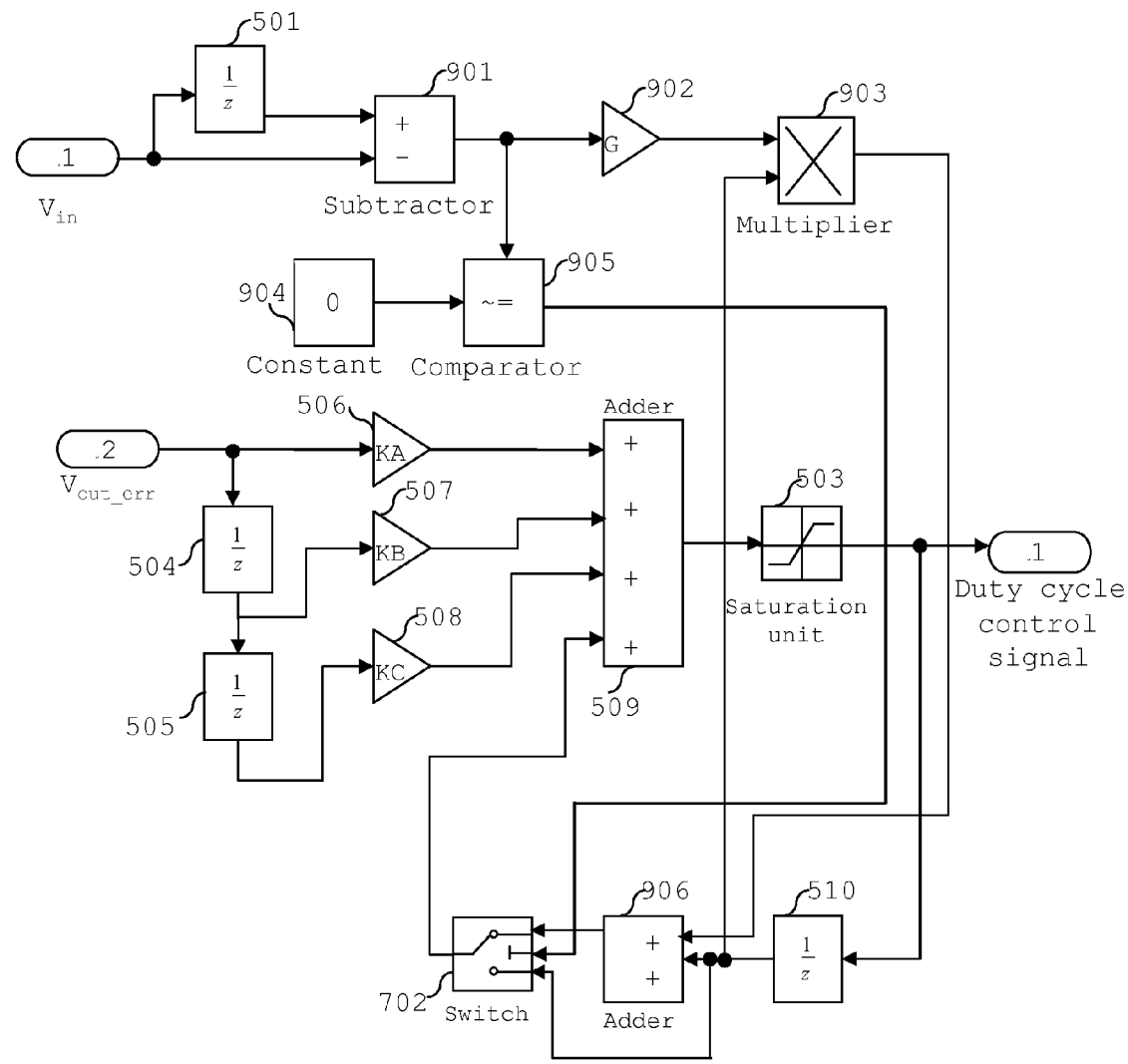
FIG. 9 is a diagram of a digital control unit for performing a simplified VFF compensation signal calculation according to a third embodiment of the invention.

A digital control unit according to the third embodiment of the invention is shown in FIG. 9.

As noted previously, the digital control unit implementation in FIG. 9 differs from that of the second embodiment, shown in FIG. 7, in the way that the VFF compensation signal is generated and combined within the feedback circuit to the integral input of the adder. To avoid repetition, previously described components of the digital control unit according to the second embodiment that are common to the third embodiment are not described again here.

The current measured input voltage value of the SMPS received on input 1 and a delayed version thereof are input into a subtractor 901 that calculates a difference between the current and delayed versions of the measured input voltage. The difference signal output from the subtractor 901 is input to an amplifier, or multiplier, 902 that amplifies, or multiplies, it with a constant gain G. The gain G is calculated in accordance with Equation 13.

The output from the amplifier 902 is fed to the first input of a multiplication unit 903. The second input to the multiplication unit 903 is the output of the delay element 510.

The output of the multiplier 903 is the VFF compensated signal, which is then fed to a first input of an adder 906. A second input to adder 906 is the output of the delay element 510. The output of adder 906 is fed to one of the inputs of switch 702. The other input of switch 702 is the output from the delay element 510 (as in the second embodiment). The output of switch 702 is the output of the feedback circuit and is fed to an input of adder 509 (as in the second embodiment).

The transient detector comprises a threshold generator unit 904 and a comparator 905. The comparator 905 compares the difference signal output from subtractor 901 with a threshold level from threshold generator unit 904. The threshold level is set in this embodiment to zero as this equally detects both positive and negative transients. If the comparison by comparator 905 determines that the difference signal is substantially non-zero, then a transient is detected.

The switch 702 is controlled by the output of the comparator 905 so that the VFF compensation is applied only when a transient has been detected, as in the second embodiment.

Advantageously, the VFF compensation signal calculation of the third embodiment does not involve a division. A computationally demanding division operation or the use of a look-up table is therefore avoided.

In an alternative implementation of the digital control unit of FIG. 9, the amplifier 902 is controlled by the comparator 905 such that the computation of the VFF compensation signal is performed only when a transient has been detected on the input signal. This reduces the power-consumption and computational requirements of the digital control unit. In addition, this allows switch 702 to be omitted and for the output of adder 906 to be input directly to adder 509.

Fourth Embodiment

Figure 10:
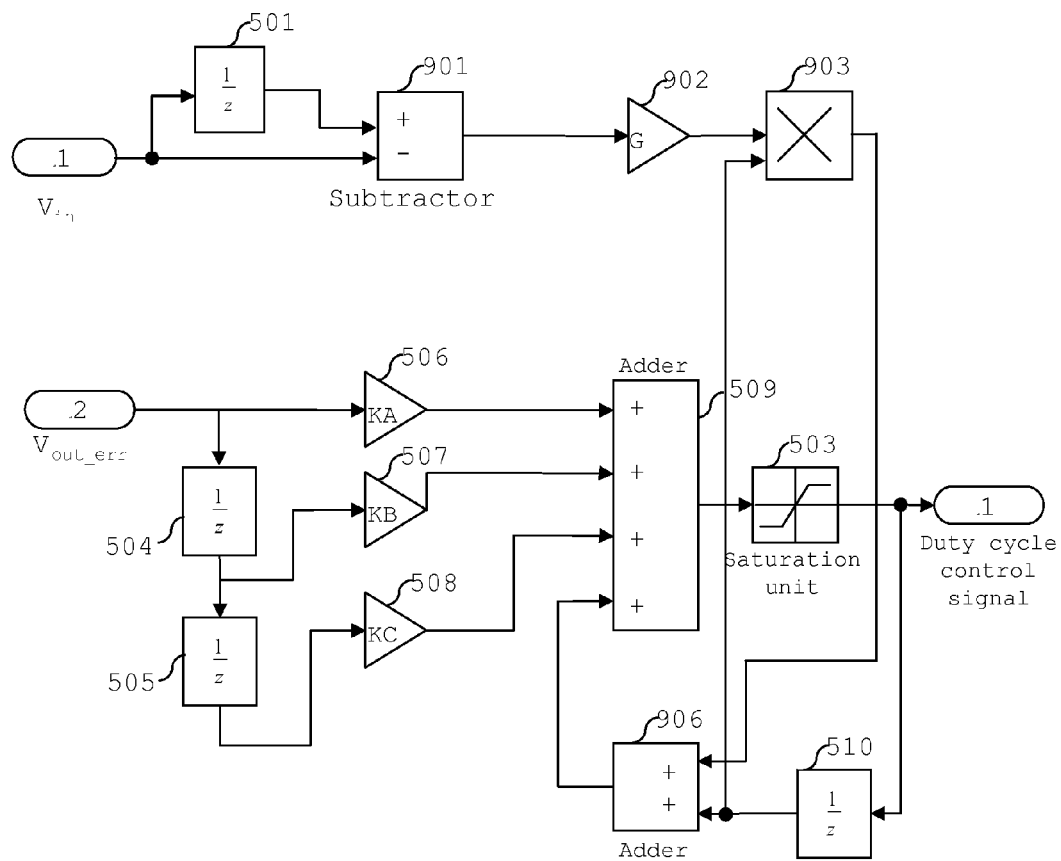
FIG. 10 is a diagram of a digital control unit for performing a simplified VFF compensation signal calculation without transient detection according to a fourth embodiment of the invention.

A fourth embodiment of the invention is shown in FIG. 10.

The fourth embodiment differs from the digital control unit of the third embodiment in that there is no transient detector and the VFF compensation is performed for every input signal sample.

Accordingly, the circuit of the fourth embodiment differs from the third embodiment shown in FIG. 9 in that the threshold generator unit 904, comparator 905 and switch 702 are omitted.

The output of adder 906 is input directly to the adder 509 so that the signal received by the adder 509 from the feedback circuit is always an addition of a delayed output of the digital control unit and a VFF compensation signal.

The other components of the circuit of FIG. 10 operate as described previously for the third embodiment.

The implementation of the digital control unit of the fourth embodiment may be advantageous when the computation time, or power-consumption, for the transient detection is comparable or greater than that for computing and applying the VFF compensation signal.

In addition, the fourth embodiment has a lower component count than the third embodiment and is therefore more appropriate for applications requiring compact digital control units.

Fifth Embodiment

In a fifth embodiment of the invention, a different circuit from the fourth embodiment is used to calculate and apply the VFF compensation signal.

From Equation 11, it is clear that the duty cycle is updated with a gain factor, C.

$$D_{new} = D_{old}(1+\Delta VG) = D_{old} \cdot C \qquad \text{Equation 14}$$

where, $$C = 1 + \Delta VG$$

The gain G is calculated as shown in Equation 13 and, as described for Equation 13, can be approximated to a constant.

Figure 11:
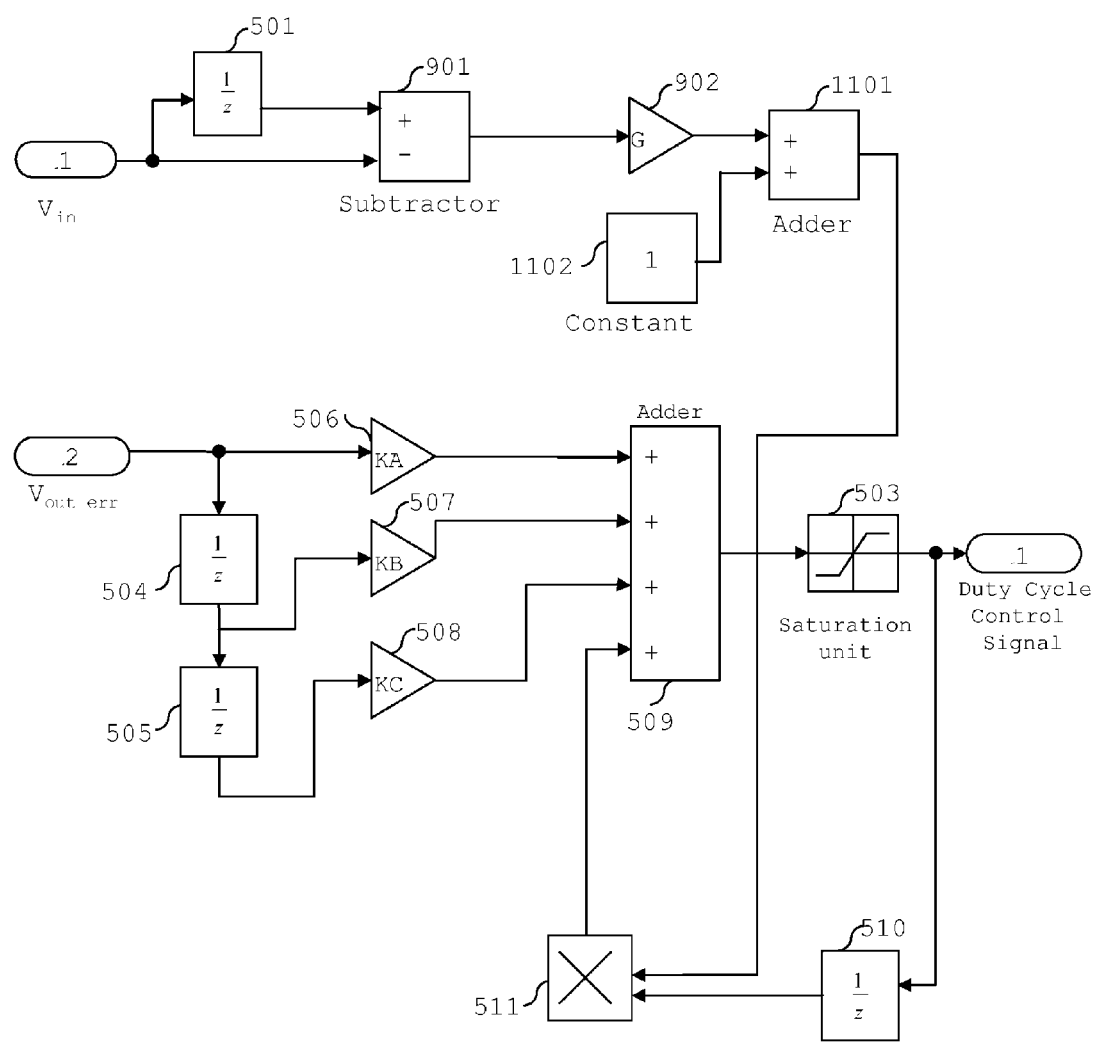
FIG. 11 is a diagram of a digital control unit for performing a simplified VFF compensation signal calculation without transient detection according to a fifth embodiment of the invention.

A digital control unit according to the fifth embodiment which controls the duty cycle in accordance with Equation 14 is shown in FIG. 11.

The digital control unit of the fifth embodiment differs from the fourth embodiment in that the multiplier 903 has been replaced with an adder 1101 and a constant value generator 1102, and adder 906 has been replaced by multiplier 511.

In the fifth embodiment, the output of amplifier 902 is input to adder 1101. Constant value generator 1102 generates and outputs a constant value (i.e. one). The output of the constant value generator is input to adder 1101.

The output of adder 1101 is input to multiplier 511. The other input to multiplier 511 is the output from delay element 510.

The output of multiplier 511 is input to adder 509.

The output signal from adder 1101 is the VFF compensation signal and is equivalent to the gain factor C. In an alternative implantation, the VFF compensation signal is generated by a look-up table that stores a value of C for each value of the difference signal output from subtractor 901.

The fifth embodiment is preferable when implementing integrated VFF compensation on a direct form 1, direct form 2 or transposed direct designs of feedback unit and a signal in the feedback circuit is multiplied by the VFF compensation signal.

When there is no input voltage transient, multiplier 511 multiplies the output of delay element 510 by one.

When an input transient occurs, the output of delay element 510 is multiplied by the gain factor C of Equation 14.

Sixth Embodiment

According to a sixth embodiment of the invention, the digital control unit of the fifth embodiment further comprises a transient detector.

A suitable transient detector is that already described for the third embodiment.

The result of the transient detection may be used to control the amplifier 902 such that a new VFF compensation signal is only generated when a transient is detected.

Alternatively, the transient detector may control a switch that is provided in the feedback circuit. A suitable arrangement is that shown in FIG. 7 for switch 702. The inputs of the switch are the outputs of multiplier 511 and delay element 510. The output of the switch is the input to adder 509 from the feedback circuit.

Accordingly, when a transient is detected, the output of multiplier 511 is input to adder 509. When no transient is detected, the output of delay element 510 is input directly to adder 509.

Seventh Embodiment

According to a seventh embodiment of the invention, an approximation of the VFF compensation signal given in Equation is calculated so that a digital control unit with lower processing requirements is realised.

The approximate VFF compensation signal of the seventh embodiment is obtained using the updated duty cycle shown below:

$$D_{new} = D_{old} + \Delta VK \qquad \text{Equation 15}$$

The output voltage becomes:

$$\begin{aligned} V_{out} &= D_{new} V_{in-new} & \text{Equation 16} \\ &= (D_{old} + \Delta VK)(V_{in-old} - \Delta V) \\ &= D_{old} V_{in-old} - D_{old}\Delta V + \Delta VK V_{in-old} - K(\Delta V)^2 \end{aligned}$$

If the gradient of the input signal is small, the term $K(\Delta V)^2$ can be neglected. The two middle terms of Equation 16 are eliminated and the output voltage becomes almost unchanged if:

$$K = \frac{D_{old}}{V_{in-old}} \qquad \text{Equation 17}$$

Using Equation 5, replacing the old duty cycle with the ideal duty cycle gives:

$$K = \frac{V_{out-old}}{V_{in-old}^2} \qquad \text{Equation 18}$$
$$= \frac{V_{out-nom}}{V_{in-old}^2}$$

$V_{out-nom}$ is typically the desired output voltage of the SMPS but it could alternatively be a previous measured output voltage.

In order to avoid the division, a constant factor K is preferable. In practice, the inventors have found that choosing a constant $V_{in-old}$ in the range $V_{in-min} \leq V_{in-old} \leq V_{in-max}$ will yield a good approximation. The factor K assumes that the duty cycle is in the range [0, 1]. If another number range is used then scaling will need to be applied.

A multiplierless realization is obtained by implementing the scale factor K as an arithmetic shift.

$$K = 2^N,$$

where, $$N = \log_2\left(\frac{V_{out-nom}}{V_{in-old}^2}\right) \qquad \text{Equation 19}$$

An improved approximation to the ideal factor K can be obtained by using several shifts and additions/subtractions using Canonic Sign Digit Code of the constant K. The calculation, that is performed by a multiplierless shift operation unit, minimizes the number add/sub operations. Operations with Canonic Sign Digit Code are described for example in U.S. Pat. No. 7,239,257 B1.

Figure 12:
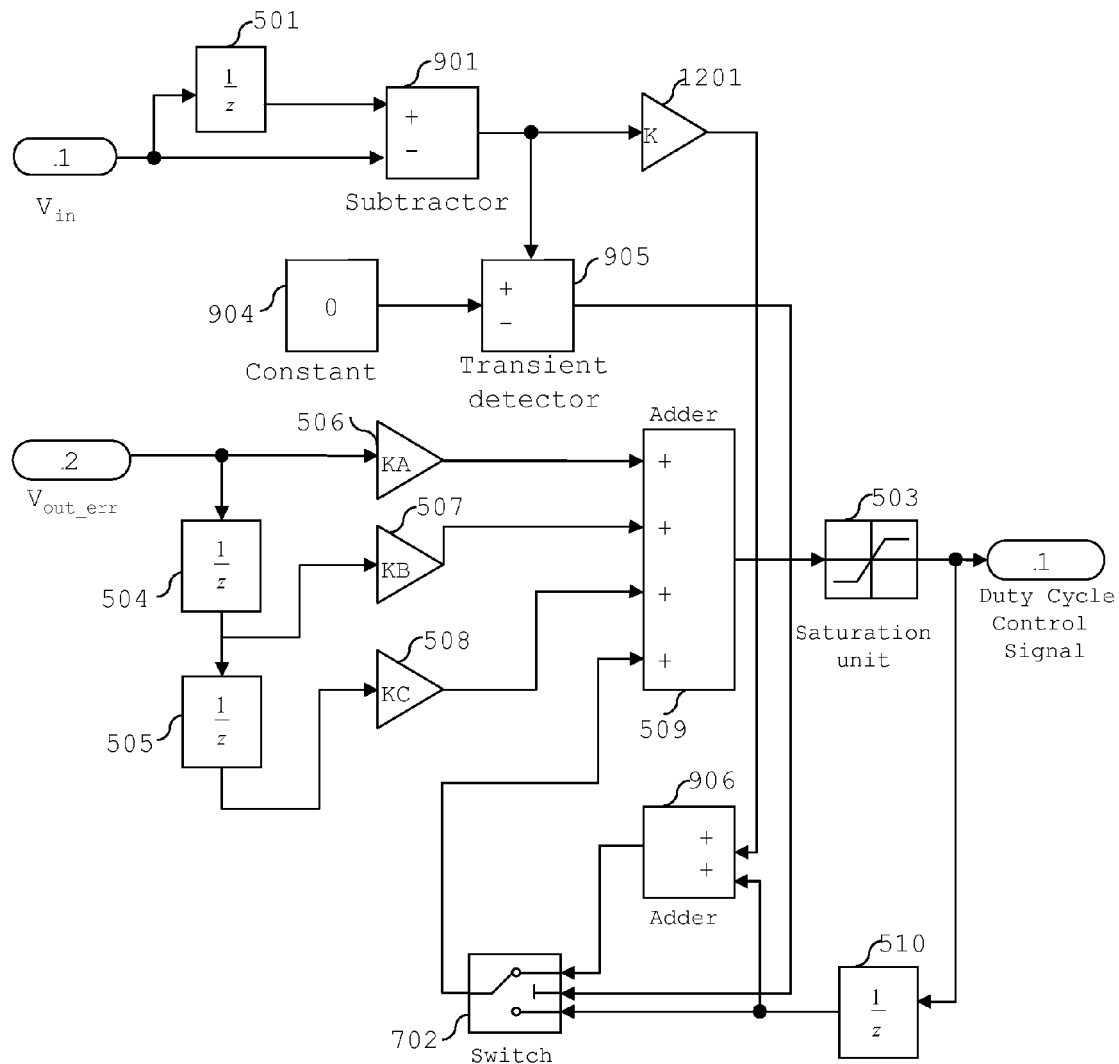
FIG. 12 is a diagram of a digital control unit for performing a simplified VFF compensation signal calculation with transient detection according to a seventh embodiment of the invention.

The digital control unit according to the seventh embodiment of the invention is shown in FIG. 12.

The digital control unit implementation in FIG. 12 differs from that of previous embodiments in the way that the VFF compensation signal is generated. To avoid repetition, previously described components of the digital control unit according to the fifth embodiment are not described again here.

In the seventh embodiment, the output of the subtractor 901 is input to an amplifier 1201 with a gain K calculated in accordance with either Equation 18 or 19.

Although described as an amplifier, amplifier 1201 may be implemented with a multiplierless shift operation unit that performs shift, addition and subtraction of operations as is known for implementations of Canonic Sign Digit Code.

The output of amplifier 1201 is fed to the input of the adder 906 which combines it with the output of delay element 510. The output of the adder 906 is fed via switch 702 to the integral input of adder 509.

As described for the third embodiment, the switch 702 is controlled by the transient detector 905 so that VFF compensation is only applied when a transient is detected.

However, in an alternative implementation of the seventh embodiment, the amplifier 1201 is controlled by the transient detector 905 such that the computation of the VFF compensation signal is performed only when a transient has been detected on the input signal. This reduces the power-consumption and computational requirements of the digital control unit. In addition, this allows switch 702 to be omitted and for the output of adder 906 to be input directly to adder 509.

Eighth Embodiment

Figure 13:
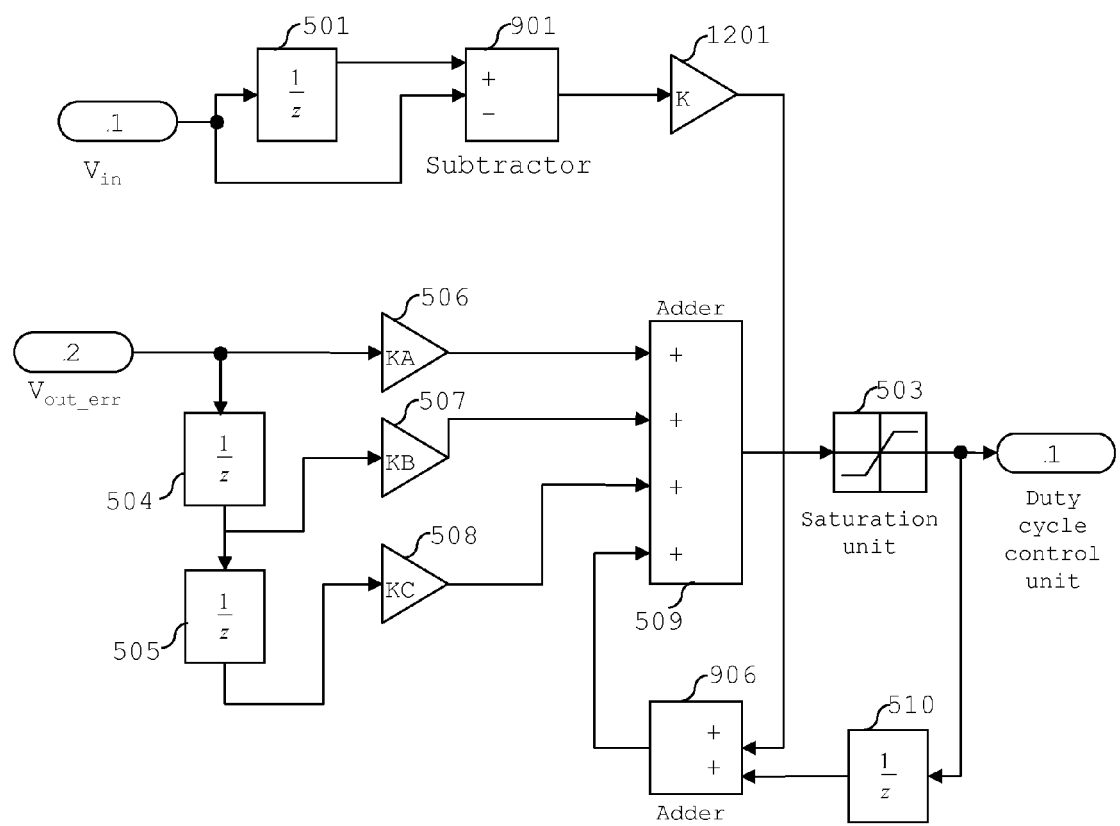
FIG. 13 is a diagram of a digital control unit for performing a simplified VFF compensation signal calculation without transient detection according to an eighth embodiment of the invention.

An eight embodiment of the invention is shown in FIG. 13.

The eight embodiment differs from the digital control unit of the seventh embodiment in that there is no transient detector and the VFF compensation is performed for every input signal sample.

The implementation of the digital control unit of the eight embodiment may be advantageous when the computation time, or power-consumption, for the transient detection is comparable or greater than that for computing and applying the VFF compensation signal.

Accordingly, the circuit of the eight embodiment differs from the fifth embodiment shown in FIG. 12 in that the threshold generator unit 904, comparator 905 and switch 702 are omitted.

The output of adder 906 is input directly to the adder 509 so that the signal received by the adder 509 from the feedback circuit is always the sum of a delayed output of the digital control unit and a VFF compensation signal.

The other components of the circuit of FIG. 13 operate as described previously for the seventh embodiment.

In addition, the eight embodiment has a lower component count than the seventh embodiment and is therefore more appropriate for applications requiring compact digital control units.

Experimental Results

FIG. 14 shows a comparison of SMPS performance with no VFF compensator, a VFF compensator applied in cascade with the feedback unit and the VFF compensator integrated into the feedback unit according to different embodiments of the invention.

In the table of FIG. 14, the different digital control unit designs were used to suppress a 5V input step, from 5V to 10V for a nominal output voltage of 3.3V. Different typical rise times were used to examine the ability of handling different gradients.

All of the VFF compensation schemes reduced the transient overshoot and undershoot very well.

The best performance was with the VFF compensator in cascade with the feedback control circuit.

However, it is clear that all of the VFF compensation schemes according to embodiments of the invention provided acceptable performance.

Furthermore, as explained previously, the VFF compensation schemes according to embodiments of the invention have a lower power-consumption, are less computationally demanding and can be implemented with simpler hardware than known digital control units comprising a cascade arrangement of a feedback unit and a VFF compensator.

Modifications and Variations

Many modifications and variations can be made to the embodiments described above.

For example, each digital control unit of the above described embodiments is a separate unit which provide a control signal for controlling the duty cycle of an SMPS. However, instead, each digital control unit may be incorporated within the SMPS.

Each digital control unit may be constructed using dedicated hardware, such as with an application-specific integrated circuit (ASIC) or a field-programmable gate array (FPGA).

For example, a problem with known digital VFF compensation signal generators, such as in the cascade arrangement in FIG. 1, is that when the input voltage is located near a quantization level of the ADC for the input voltage, measurement noise will sometimes cause the quantized version of the input signal to change. The VFF compensation will then introduce transients on the output voltage even when the input voltage is nearly constant.

An additional problem is experienced when the input voltage is changing slowly and feedback is compensating for the changes. When the input voltage then changes from one quantization level to the next, the VFF compensation will add additional compensation which introduces transients on the output voltage.

Modifications can therefore be made to the embodiments described above to address these problems. For example, one improved form of transient detection is shown in FIG. 15.

Figure 15:
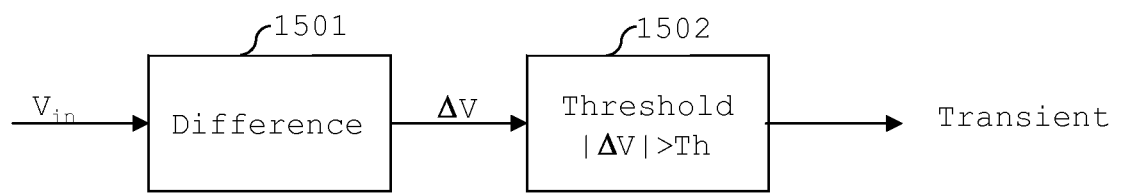
FIG. 15 is a block diagram of an improved transient detector according to a modification applicable to embodiments of the invention.

Referring to FIG. 15, difference unit 1501 calculates a difference between a current measured input signal and a previous measured input signal. The magnitude of the difference is calculated and compared by a comparator 1502 to a threshold level. A transient is detected only if the magnitude of the difference signal is greater than the threshold level.

In an alternative arrangement to that shown in FIG. 15, a transient is detected only if the magnitude of the change of the difference signal is greater than or equal to the threshold level.

By setting the threshold to 2Q, where Q is the size of a quantization step in the input voltage ADC, the above-identified problems are overcome.

Figure 16:
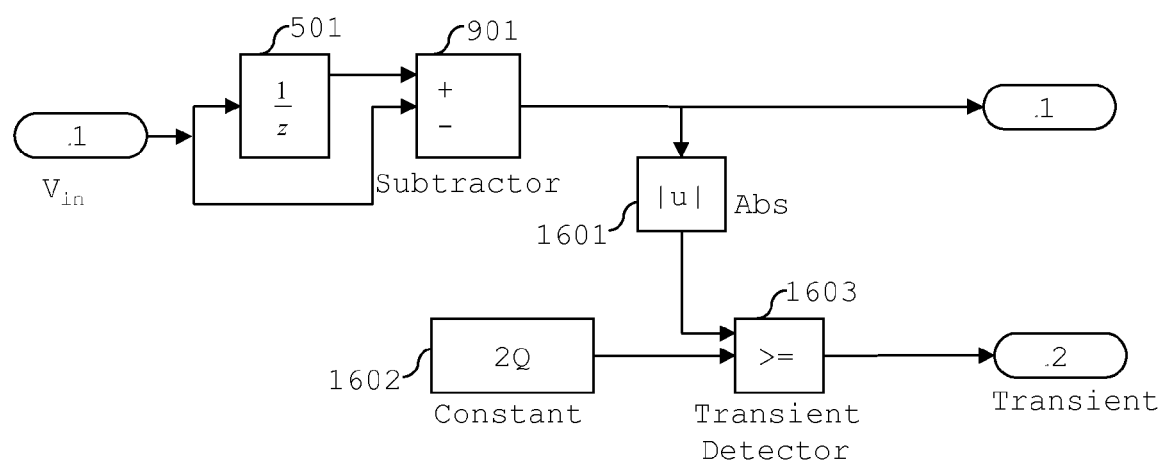
FIG. 16 is a diagram of an improved transient detector according to a modification applicable to embodiments of the invention.

A circuit for implementing transient detection according to above-described modification is shown in FIG. 16.

The generation of the difference signal output from subtractor 901, is the same as in the description for the third embodiment is not repeated here.

Magnitude determining unit 1601 is provided for determining the absolute value, or magnitude value, of the change in input signal.

Threshold generating unit 1602 provides a constant threshold level which is set at 2Q. Comparator 1603 compares the output of the magnitude determining unit 1601 and the threshold output by threshold generating unit 1602 and detects a transient if the magnitude value of the change in input voltage is greater than or equal to the threshold value.

Preferably, one more bit in the input voltage ADC is used, additional to the number of input voltage ADC bits in transient detectors not according to the modification of FIG. 16. The step size 2Q is then the same size as a quantization step of the previously described transient detectors. The above-identified problems are therefore overcome without the performance of the VFF compensation decreasing due to quantization error.

Figure 17:
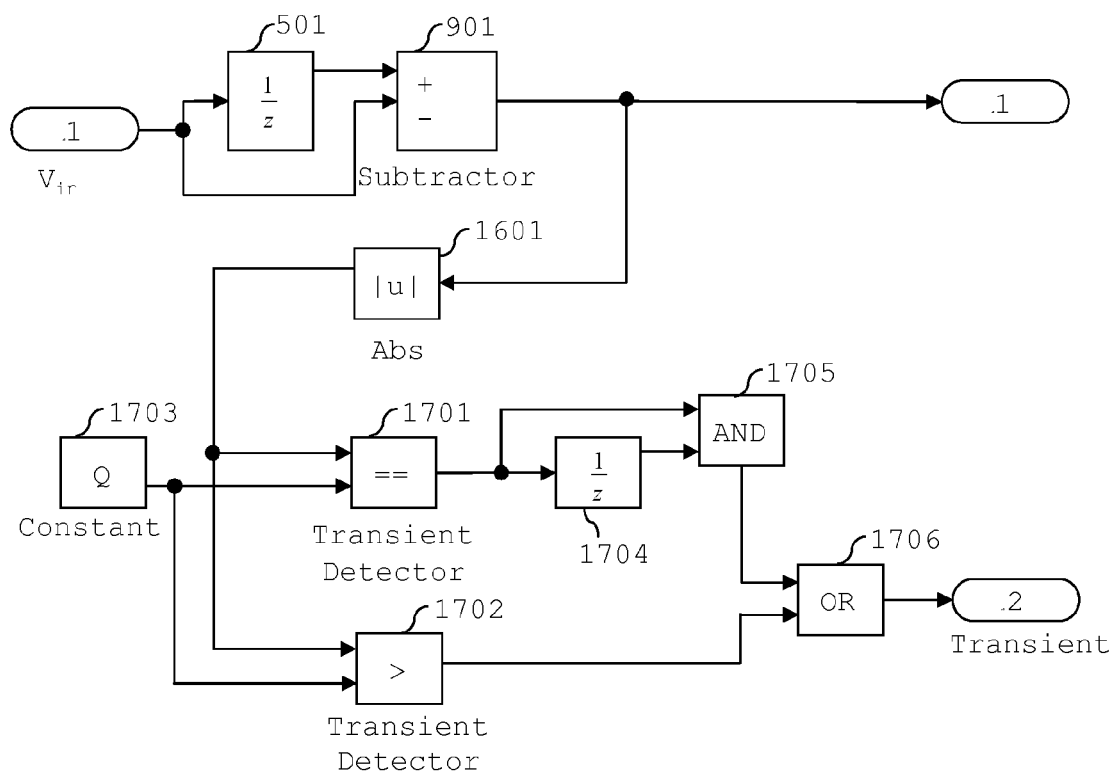
FIG. 17 is a diagram of an improved transient detector according to a modification applicable to embodiments of the invention.

Another implementation of a transient detector is shown in FIG. 17.

In the transient detector of FIG. 17, a transient is detected if the magnitude values of two consecutive samples of the difference signal output from the magnitude determining unit 1601 are equal to Q, where Q is the size of the quantification step in the input voltage ADC. In addition, a transient is also detected if the magnitude value of the difference signal output from magnitude determining unit 1601 is greater than Q.

Accordingly, the transient detector of FIG. 17 comprises threshold generating unit 1703 that provides a constant threshold level set at Q.

Comparator 1701 receives the threshold level output form the threshold level generating unit and the magnitude of the difference signal u output from magnitude |u| determining unit 1601. The output of the comparator 1701 is □one□ if the values of its two inputs are equal.

The output of comparator 1701 is split and a split part is input to delay element 1704. The output of delay element 1704 and the other split part of the output of comparator 1701 are input to the logic (AND) gate 1705.

The output of logic gate 1705 is only □one□ when both of its inputs are □one□. Consequently, when the output of logic gate 1705 is □one□, two consecutive magnitudes of difference signal have been at the threshold value Q.

The outputs of magnitude determining unit 1601 and threshold level generating unit are also input to comparator 1702. The output of comparator 1702 is □one□ when the value of the output |u| of magnitude determining unit 1601 is greater than the threshold level Q.

Logic (OR) gate 1706 receives the outputs of comparator 1702 and logic gate 1705, and outputs a result of □one□ when at least one of its inputs is □one□.

Consequently, a transient is detected when either two consecutive magnitude values of the difference signal are at the threshold level Q or if the magnitude value of the difference signal is greater than the threshold level Q.

Advantageously, the transient detector of FIG. 17 does not compare the magnitude of the difference signal with a threshold value of 2Q and so, unlike the transient detector in FIG. 16, the ADC used to quantise the input signal does not require an extra bit to avoid an increase in quantization error.

The transient detector of FIG. 17 is therefore preferable when it is difficult to increase the number of bits of the ADC.

The transient detectors of the above-described modifications are suitable for use as the transient detector of the digital control units of any of the second, third, sixth or seventh embodiments described herein.

With regard to determining an appropriate size of the quantisation step, the minimum slew rate in the input voltage transient that is compensated for can be calculated as:

$$Slew_{min} = \frac{2Q}{T_s} \qquad \text{Equation 20}$$

Accordingly, an appropriate quantisation step size Q for the ADC can be chosen for a required minimum slew rate for VFF compensation. Alternatively, it is possible to achieve the required minimum slew rate by adjusting the sampling period, $T_S$, of the input voltage measurement.

A further modification of the digital control units according to the embodiments herein is described below.

In the described embodiments, the VFF compensation signal was introduced into the feedback circuit at a position before the integral input to the adder and after the delay element 510. However, for the digital control units of each embodiment, it is alternatively possible to introduce the compensation signal at any point within the feedback circuit between the output of the adder and the input of the adder from the feedback circuit. For example, with reference to FIG. 7, the VFF compensation signal could alternatively have been introduced between the adder 509 and the hard limiter 503 or between the hard limiter 503 and the delay element 510. The different locations of introducing the VFF compensation signal into the feedback loop yield little effect on the performance of the VFF compensation.

In the embodiments described above, a PID control scheme is employed in the feedback unit. However, it should be noted that other configurations of feedback unit are possible in an embodiment instead of a PID configuration. For example, a feedback unit that implements PI, PD, P, I, FIR or other control techniques could alternatively have been applied.

Other modifications are, of course possible.

The foregoing description of embodiments of the invention has been presented for the purpose of illustration and description. It is not intended to be exhaustive or to limit the invention to the precise form disclosed. Alternations, modifications and variations can be made without departing from the spirit and scope of the present invention.

The invention claimed is:

1. A digital control unit operable to calculate a digital control signal for controlling a duty cycle of a switched mode power supply, the digital control unit comprising:
   an adder having at least a first input configured to receive a signal dependent upon an output voltage of the switched mode power supply, a second input configured to receive a signal from a feedback circuit, and an output configured to output an output signal comprising a sum of the signals applied to the inputs;
   a second output configured to output the digital control signal for controlling the duty cycle of the switched mode power supply, the digital control signal being dependent upon the output signal from the adder;
   a voltage feed forward compensation signal generator configured to calculate a compensation signal to adjust the digital control signal based on an input voltage of the switched mode power supply; and
   the feedback circuit positioned between the output of the adder and the second input of the adder and configured to calculate a compensated feedback signal by combining the compensation signal with a signal dependent upon the output of the adder and to feed the compensated feedback signal to the second input of the adder.

2. The digital control unit according to claim 1, wherein the feedback circuit is configured to calculate the compensated feedback signal by adding the compensation signal with the signal dependent upon the output of the adder.

3. The digital control unit according to claim 1, wherein the signal dependent upon the output voltage of the switched mode power supply is an error signal representing a difference between a measured output voltage and a desired output voltage of the switched mode power supply.

4. The digital control unit according to claim 1 wherein the output includes a hard limiter configured to limit the digital control signal to lie with upper and lower limits.

5. A switched mode power supply having the digital control unit according to claim 1.

6. The digital control unit according to claim 1, wherein the feedback circuit comprises:
   a delay element configured to delay one of said signal dependent upon the output of the adder and said calculated compensated feedback signal so that the signal received by the second input of the adder comprises a delayed signal.

7. The digital control unit according to claim 6, wherein the feedback circuit further comprises:
   a splitter configured to split the digital control signal into first and second signals, and to provide the first signal to the output for output thereby; and
   a combiner configured to generate the compensated feedback signal;
   wherein,
      the delay element is configured to delay the second signal from the splitter to provide a delayed digital control signal; and
      the combiner is configured to combine the compensation signal with the delayed digital control signal to generate the compensated feedback signal.

8. The digital control unit according to claim 1 wherein the voltage feed forward compensation signal generator comprises:
   a delay element configured to generate a delayed version of a signal representing the input voltage of the switched mode power supply; and
   the combiner configured to receive current and delayed versions of the signal representing the input voltage and configured to generate the compensation signal by combining the current version and the delayed version.

9. The digital control unit according to claim 8, wherein the combiner of the voltage feed forward compensation signal generator comprises:
   a subtractor configured to generate a difference signal representing a difference between the delayed and current versions of the signal representing the input voltage.

10. The digital control unit according to claim 8, wherein the voltage feed forward compensation signal generator further comprises:
   a first multiplier configured to multiply the difference signal by a gain G; and
   a second multiplier configured to multiply the output of the first multiplier with a delayed version of the digital control signal to generate the compensation signal.

11. The digital control unit according to claim 10, wherein the gain G of the first multiplier is a constant and is determined as:

$$G = \frac{1}{V_{in\_old}}$$

where, $$V_{in\text{-}min} \leq V_{in\text{-}old} \leq V_{in\text{-}max}$$

and,
$V_{in\text{-}min}$ is a minimum measured input voltage and
$V_{in\text{-}min}$ is a maximum measured input voltage.

12. The digital control unit according to claim 8, wherein the voltage feed forward compensation signal generator further comprises:
   a multiplierless shift operation unit configured to apply a gain K to the difference signal to generate the compensation signal.

13. The digital control unit according to claim 12, wherein the gain K of the multiplierless shift operation unit is a constant and determined as:

$$K = \frac{V_{out\_nom}}{V_{in\_old}^2}$$

where, $$V_{in\text{-}min} \leq V_{in\text{-}old} \leq V_{in\text{-}max}$$

and,
$V_{in\text{-}max}$ is a minimum measured input voltage,
$V_{in\text{-}min}$ is a maximum measured input voltage and
$V_{out\text{-}nom}$ is set based on one of a previous measured output voltage and a desired output voltage.

14. The digital control unit according to claim 12, wherein the multiplierless shift operation unit is configured to perform shift, addition and subtraction operations using a Canonic Sign Digit Code of the gain K.

15. The digital control unit according to claim 1, wherein the feedback circuit is configured to calculate the compensated feedback signal by multiplying the compensation signal with the signal dependent upon the output of the adder, and wherein the voltage feed forward compensation signal generator comprises:
the delay element configured to generate a delayed version of a signal representing the input voltage of the switched mode power supply;
the subtractor configured to receive a current version and the delayed version of the signal representing the input voltage and configured to generate a difference signal representing a difference there between;
a multiplier configured to multiply the difference signal by a gain G;
a constant value generator configured to output a constant value; and
a VFF adder configured to receive the outputs from the multiplier and constant value generator and configured to output a signal comprising the sum thereof;
wherein:
the signal output from said VFF adder is the compensation signal; and
the gain G of the multiplier is a constant and is determined as:

$$G = \frac{1}{V_{in\ old}}$$

where,
$V_{in\text{-}min} \leq V_{in\text{-}old} \leq V_{in\text{-}max}$
and,
$V_{in\text{-}min}$ is a minimum measured input voltage and
$V_{in\text{-}max}$ is the maximum measured input voltage.

16. The digital control unit according to claim 15, wherein the feedback circuit further comprises:
a splitter configured to split the digital control signal into first and second signals, and to provide the first signal to the output for output thereby; and
the combiner configured to generate the compensated feedback signal;
wherein:
the delay element is configured to delay the second signal from the splitter to provide a delayed digital control signal; and
the combiner is configured to multiply the compensation signal with the delayed digital control signal to generate the compensated feedback signal.

17. The digital control unit according to claim 1, further comprising:
a transient detector configured to determine if a transient has occurred on the input voltage of the switched mode power supply; and
a switch configured to switch the feedback circuit between a first state, in which the signal input to the second input of the adder is dependent upon a combination of the compensation signal calculated based on a current input voltage of the switched mode power supply and the signal dependent upon the output of the adder and a second state in which the signal input to the second input of the adder is dependent upon the output of the adder but not dependent upon a compensation signal calculated based on the current input voltage;
wherein the transient detector is configured to control the switch based on a result of the transient determination thereby, such that the switch switches the feedback circuit into the first state when the transient is detected on the input voltage, and the second state when no transient is detected on the input voltage.

18. The digital control unit according to claim 17, wherein the switch is configured to receive the compensated feedback signal and the signal dependent upon the output of the adder, and is further configured to pass the compensated feedback signal to the second input of the adder in the first state, and to pass the signal dependent upon the output of the adder to the second input of the adder in the second state.

19. The digital control unit according to claim 17 wherein the transient detector comprises:
a comparator configured to receive a difference signal representing a difference between current and delayed versions of a signal representing the input voltage of the switched mode power supply and configured to compare the difference signal to a threshold value to determine if a transient has occurred.

20. The digital control unit according to claim 19, wherein said threshold value is zero.

21. The digital control unit according to claim 17 wherein:
the transient detector is further configured to receive a difference signal representing a difference between current and delayed versions of a signal representing the input voltage of the switched mode power supply, the transient detector comprising:
a magnitude determining unit configured to determine the magnitude of the difference signal; and
a comparator configured to compare the determined magnitude of the difference signal with a threshold value, and to determine if the transient has occurred based on the comparison result.

22. The digital control unit according to claim 21, wherein said threshold value is set at twice a size of a quantization step of an analogue-to-digital convertor used to digitize the input voltage.

23. The digital control unit according to claim 17, wherein:
the transient detector is further configured to receive a difference signal representing a difference between current and delayed versions of a signal representing the input voltage of the switched mode power supply, the transient detector comprising:
a magnitude determining unit configured to determine a magnitude of the difference signal;
a first comparator configured to compare the determined magnitude of the difference signal with a threshold value, to detect if the determined magnitude of the difference signal is equal to the threshold value, and to output a signal based on the detection;
a delay element configured to receive the signal output by the first comparator and to output a delayed version of the received signal;
a first logic gate configured to receive the signals output by the first comparator and the delay element and to output a high signal if both of the received signals indicate that the determined magnitude of the difference signal is equal to the threshold value;
a second comparator configured to compare the determined magnitude of the difference signal with the threshold value, to detect if the determined magnitude of the difference signal is greater than the threshold value, and to output a high signal if the determined magnitude of the difference signal is above the threshold value; and
a second logic gate configured to receive the signals output by the first logic gate and the second comparator and to output a signal indicating that a transient has occurred if one of the received signals is a high signal.

24. The digital control unit according to claim 23, wherein said threshold value is set to be a size of a quantization step of an analogue-to-digital convertor used to digitize the input voltage.

25. A method of calculating a digital control signal for controlling a duty cycle of a switched mode power supply, the method comprising:
measuring an input voltage and an output voltage of the switched mode power supply;
adding a first input signal dependent upon the output voltage of the switched mode power supply with a second signal comprising a previously calculated compensated feedback signal to generate a summation signal comprising a sum of the first input signal and the second signal;
outputting a digital control signal to the switched mode power supply to control the duty cycle thereof such that the digital control signal is dependent upon the summation signal;
generating a compensation signal configured to adjust a subsequent digital control signal based on the input voltage of the switched mode power supply; and
calculating a compensated feedback signal by combining the compensation signal with a signal dependent upon, the summation signal.

26. The method according to claim 25, wherein calculating the compensated feedback signal comprises:
adding said compensation signal with the signal dependent upon said summation signal.

27. The method according to claim 25, wherein calculating the compensated feedback signal comprises:
multiplying said compensation signal with a signal dependent upon said summation signal;
wherein, generating the compensation signal comprises:
delaying a signal that is dependent upon the input voltage of the switched mode power supply;
generating a difference signal by subtracting a current version of the signal representing the input voltage from a delayed version of thereof;
amplifying the difference signal with a gain G; and
adding said amplified difference signal to a constant value to generate the compensation signal;
wherein,
the gain G is a constant and is determined as:

$$G = \frac{1}{V_{in-old}}$$

where
$$V_{in-min} \leq V_{in-old} \leq V_{in-max}$$
and,
$V_{in-min}$ is a minimum measured input voltage and
$V_{in-max}$ is a maximum measured input voltage.

28. The method according to claim 25 further comprising:
delaying one of the signal dependent upon the summation signal and the compensated feedback signal such that said second signal added to said first input signal is a delayed signal.

29. The method according to claim 25 wherein generating the compensation signal comprises:
delaying a second input signal that is dependent upon the input voltage of the of the switched mode power supply; and
combining current and delayed versions of said second input signal to generate the compensation signal.

30. The method according to claim 29, wherein combining the current and delayed versions of the second input signal comprises:
generating a difference signal by subtracting the current version of said second input signal from the delayed version of said second input signal.

31. The method according to claim 30, wherein generating the compensation signal further comprises:
amplifying the difference signal with a gain G; and
multiplying said amplified difference signal with a delayed version of the control signal.

32. The method according to claim 31, wherein the gain G is a constant and is determined as:

$$G = \frac{1}{V_{in-old}}$$

where,
$$V_{in-min} \leq V_{in-old} \leq V_{in-max}$$
and,
$V_{in-min}$ is a minimum measured input voltage and
$V_{in-max}$ is a maximum measured input voltage.

33. The method according to claim 30, wherein generating the compensation signal further comprises:
amplifying the difference signal with a gain K using multiplierless shift operations.

34. The method according to claim 33, wherein the gain K is a constant and is determined as:

$$K = \frac{V_{out\,nom}}{V_{in\,old}^2}$$

where,
$$V_{in-min} \leq V_{in-old} \leq V_{in-max}$$
and,
$V_{in-min}$ is a minimum measured input voltage,
$V_{in-max}$ is a maximum measured input voltage and
$V_{out-nom}$ is set based on one of a previous measured output voltage and a desired output voltage.

35. The method according to claim 33 wherein the multiplierless shift operations comprise:
performing shift, addition and subtraction operations using a Canonic Sign Digit Code of the gain K.

36. The method according to claim 25 further comprising:
determining if a transient has occurred on the input voltage of the switched mode power supply;
switching between a first state, in which said previously calculated compensated feedback signal is dependent upon a combination of the compensation signal generated based on the current input voltage of the switched mode power supply and a signal dependent upon the summation signal, and a second state, in which said previously calculated compensated feedback signal is dependent upon a signal dependent upon the summation signal but not dependent upon the compensation signal generated based on the current input voltage of the switched mode power supply; and
wherein the switching between the first and second states is controlled based on a result of the transient determination such that the digital control signal is calculated in the first state when the transient is detected and the digital control signal is calculated in the second state when the transient is not detected.

37. The method according to claim 36 wherein detecting the transient comprises:
   receiving a difference signal representing a difference between a second input signal that is dependent upon the input voltage of the of the switched mode power supply and a delayed version of said second input signal;
   determining a magnitude of said difference signal;
   comparing the determined magnitude of said difference signal with a threshold value; and
   determining if the transient has occurred based on the comparison result.

38. The method according to claim 37 wherein said threshold value is set at twice a size of a quantization step of an analogue-to-digital converter used to digitize the measured input voltage.

39. The method according to claim 36 wherein detecting a transient comprises:
   receiving a difference signal representing a difference between a signal that is dependent upon the input voltage of the switched mode power supply and a delayed version thereof;
   determining a magnitude of said difference signal;
   comparing the determined magnitude of the difference signal with a threshold value, detecting if the determined magnitude of the different signal is equal to the threshold value, and outputting a signal based on the detection;
   comparing said signal output based on the detection with a delayed version thereof and outputting a first transient detection signal based on the comparison result;
   comparing the determined magnitude of the difference signal with the threshold value, detecting if the determined magnitude of the difference signal is greater than the threshold value, and outputting a second transient detection signal based on the detection; and
   outputting a signal indicating that a transient has occurred if one of the first or second transient detection signals indicates that a transient has occurred.

40. The method according to claim 39 wherein said threshold value is set at a size of a quantization step of an analogue-to-digital converter used to digitize the measured input voltage.

* * * * *

UNITED STATES PATENT AND TRADEMARK OFFICE
CERTIFICATE OF CORRECTION

PATENT NO. : 8,816,663 B2  Page 1 of 2
APPLICATION NO. : 13/318609
DATED : August 26, 2014
INVENTOR(S) : Karlsson et al.

It is certified that error appears in the above-identified patent and that said Letters Patent is hereby corrected as shown below:

On the Title Page, in the Figure, delete " 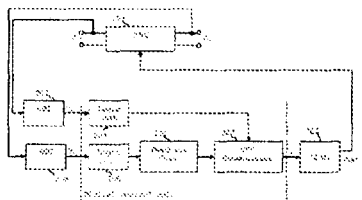 " and insert -- 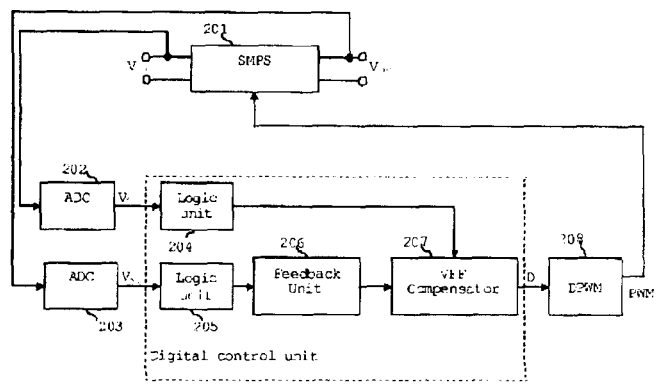 --, therefor.

On the Title Page, in item (57), under "ABSTRACT", in Column 2, Line 8, delete "cycle, the control" and insert -- cycle the digital control --, therefor.

On the Title Page, in item (57), under "ABSTRACT", in Column 2, Line 11, delete "the" and insert -- the digital --, therefor.

On the Title Page, in item (57), under "ABSTRACT", in Column 2, Line 13, delete "circuit" and insert -- circuit arranged --, therefor.

In the Specification

In Column 14, Line 41, delete "Equation" and insert -- Equation 7 --, therefor.

Signed and Sealed this
Twenty-fifth Day of August, 2015

Michelle K. Lee
*Director of the United States Patent and Trademark Office*

CERTIFICATE OF CORRECTION (continued)
U.S. Pat. No. 8,816,663 B2

In the Claims

In Column 20, Line 28, in Claim 11, delete "$G = \frac{1}{V_{in\ old}}$" and insert -- $G = \frac{1}{V_{in-old}}$ --, therefor.

In Column 20, Line 36, in Claim 11, delete "$V_{in\text{-}min}$" and insert -- $V_{in\text{-}max}$ --, therefor.

In Column 20, Line 48, in Claim 13, delete "$K = \frac{V_{out\ nom}}{V_{in\ old}^2}$" and insert -- $K = \frac{V_{out-nom}}{V_{in-old}^2}$ --, therefor.

In Column 20, Line 56, in Claim 13, delete "$V_{in\text{-}max}$" and insert -- $V_{in\text{-}min}$ --, therefor.

In Column 20, Line 57, in Claim 13, delete "$V_{in\text{-}min}$" and insert -- $V_{in\text{-}max}$ --, therefor.

In Column 21, Line 25, in Claim 15, delete "$G = \frac{1}{V_{in\ old}}$" and insert -- $G = \frac{1}{V_{in-old}}$ --, therefor.

In Column 23, Line 24, in Claim 25, delete "upon," and insert -- upon --, therefor.

In Column 23, Line 50, in Claim 27, delete "where" and insert -- where, --, therefor.

In Column 23, Line 64, in Claim 29, delete "of the of the" and insert -- of the --, therefor.

In Column 24, Line 33, in Claim 34, delete "$K = \frac{V_{out\ nom}}{V_{in\ old}^2}$" and insert -- $K = \frac{V_{out-nom}}{V_{in-old}^2}$ --, therefor.

In Column 25, Line 5, in Claim 37, delete "of the of the" and insert -- of the --, therefor.